US012678365B1

(12) United States Patent
Liu et al.

(10) Patent No.: US 12,678,365 B1
(45) Date of Patent: Jul. 14, 2026

(54) SYSTEM, APPARATUS, AND METHOD FOR PROVIDING A SEXUAL STIMULATION DEVICE

(71) Applicant: HYTTO PTE. LTD, Singapore (SG)

(72) Inventors: Dan Liu, Singapore (SG); Wen Liu, Guangdong (CN)

(73) Assignee: HYTTO PTE. LTD, Singapore (SG)

(*) Notice: Subject to any disclaimer, the term of this patent is extended or adjusted under 35 U.S.C. 154(b) by 0 days.

(21) Appl. No.: 19/391,093

(22) Filed: Nov. 17, 2025

(30) Foreign Application Priority Data

May 29, 2025 (CN) ........................ 202520921465.4

(51) Int. Cl.
*A61H 19/00* (2006.01)
*A61H 23/02* (2006.01)

(52) U.S. Cl.
CPC ............. *A61H 19/32* (2013.01); *A61H 19/44* (2013.01); *A61H 23/02* (2013.01); *A61H 2201/1207* (2013.01); *A61H 2201/169* (2013.01); *A61H 2201/5007* (2013.01); *A61H 2201/5092* (2013.01); *A61H 2201/5097* (2013.01)

(58) Field of Classification Search
CPC ..................................................... A61H 19/32
See application file for complete search history.

(56) References Cited

U.S. PATENT DOCUMENTS

| | | | | |
|---|---|---|---|---|
| 6,793,619 B1 * | 9/2004 | Blumental | ............. | A61H 19/32 600/38 |
| 10,154,832 B2 | 12/2018 | Cai | | |
| 2016/0279020 A1 * | 9/2016 | Timmermans | ......... | A61H 19/00 |
| 2020/0147808 A1 | 5/2020 | Pirzchalski | | |
| 2020/0268596 A1 * | 8/2020 | Shubin, Sr. | ............ | A61H 19/32 |

* cited by examiner

*Primary Examiner* — Thaddeus B Cox
(74) *Attorney, Agent, or Firm* — Keefe IP Law, PLLC

(57) ABSTRACT

A sexual stimulation device is disclosed. The sexual stimulation device has a housing, at least one end portion of which includes an opening, a flexible massage portion, which is at least partially disposed in the housing, and includes a massage channel that is configured to accommodate a phallic member and an insertion opening configured to allow the phallic member to enter and exit the massage channel, and a sensor component, which is disposed within the housing, and is configured to monitor changes in parameters related to a volume of the flexible massage portion caused by a movement of the phallic member in the massage channel, thereby providing data support for monitoring the movement of the phallic member.

20 Claims, 23 Drawing Sheets

SYSTEM, APPARATUS, AND METHOD FOR PROVIDING A SEXUAL STIMULATION DEVICE

CROSS-REFERENCE TO RELATED APPLICATIONS

This application claims priority to Chinese Patent Application No. 2025209214654 filed on May 29, 2025.

FIELD OF THE INVENTION

The present disclosure generally relates to a system, apparatus, and method for providing a device, and more particularly to a system, apparatus, and method for providing a sexual stimulation device.

BACKGROUND OF THE INVENTION

In the field of sexual health and sexual pleasure products, adult devices such as adult toys (e.g., sex toys) can be used to provide sexual stimulation to a user. Some adult toys provide sexual stimulation of female or male erogenous zones. For example, sexual massagers have been widely used as devices to assist in obtaining sexual stimulation and pleasure.

Conventional sexual massagers typically have relatively simple functions, for example primarily providing physical vibration or massage stimulation. However, as users' desires for increasingly personalized experiences increase, current technologies are gradually revealing their shortcomings. For example, conventional sexual massagers typically lack adequate data interaction features for meeting users' desires.

A significant issue related to the shortcomings of conventional sexual massagers is a lack of substantially precise monitoring capabilities for key data during user operation of sexual massagers. For example regarding male sexual massagers, it is typically very difficult for conventional massagers to accurately measure information such as an insertion depth or a thrusting frequency of a user's penis inside of the massager. That is, conventional male massagers typically fail to provide sufficient quantitative collection of data related to movement of the user's penis.

This lack of sufficient quantitative data can hinder the collection of substantially accurate information regarding user habits, physiological responses, and preferences, which can degrade a user's ability to substantially precisely control, adjust, and personalize the massage process for the user. This lack of sufficient quantitative data can also hinder the development of data-driven personalized product features and user interaction sharing.

Accordingly, a need in the art exists for an efficient and effective technique to provide sufficient quantitative collection of data during the use of adult toys such as a sexual massager.

The exemplary disclosed system and method are directed to overcoming one or more of the shortcomings set forth above and/or other deficiencies in existing technology.

SUMMARY OF THE INVENTION

In one exemplary aspect, the present disclosure is directed to a sexual stimulation device. The sexual stimulation device includes a housing, at least one end portion of which includes an opening, a flexible massage portion, which is at least partially disposed in the housing, and includes a massage channel that is configured to accommodate a phallic member and an insertion opening configured to allow the phallic member to enter and exit the massage channel, and a sensor component, which is disposed within the housing, and is configured to monitor changes in parameters related to a volume of the flexible massage portion caused by a movement of the phallic member in the massage channel, thereby providing data support for monitoring the movement of the phallic member.

In another aspect, the present disclosure is directed to a monitoring method. The monitoring method includes monitoring a sexual stimulation device that includes a massage portion that is configured to apply sexual stimulation to at least a genital portion of a user, and a sensor component, which is configured to monitor changes in parameters related to the massage portion caused by a relative movement of the massage portion and the genital portion, thereby providing data support for monitoring the relative movement of the massage portion and the genital portion. The monitoring method also includes monitoring the changes in parameters related to the massage portion, including performing static data acquisition by obtaining static three-dimensional data related to the massage portion in a non-working state using the sensor component, performing target data acquisition by obtaining real-time three-dimensional data related to the massage portion in a working state using the sensor component, and comparing the real-time three-dimensional data with the static three-dimensional data to determine a target three-dimensional data that has undergone changes, and performing analysis based on the target three-dimensional data, including analyzing and obtaining a motion trajectory of the massage portion.

In another aspect, the present disclosure is directed to a sexual stimulation system. The sexual stimulation system includes a sexual stimulation device and a remote device that is configured to communicate with the sexual stimulation device. The sexual stimulation device includes a housing, at least one end portion of which includes an opening, a flexible massage portion, which is at least partially disposed in the housing, and includes a massage channel that is configured to accommodate a phallic member and an insertion opening configured to allow the phallic member to enter and exit the massage channel, and a sensor component, which is disposed within the housing, and is configured to monitor changes in parameters related to a volume of the flexible massage portion caused by a movement of the phallic member in the massage channel, thereby providing data support for monitoring the movement of the phallic member.

DETAILED DESCRIPTION AND INDUSTRIAL APPLICABILITY

In at least some exemplary embodiments, an adult toy such as a sexual stimulation device is disclosed. The exemplary disclosed interactive sexual device may for example be used with system 300 described below. The exemplary disclosed sexual stimulation device may include a housing, at least one end portion of which may be provided with an opening. The exemplary disclosed sexual stimulation device may also include a flexible massage portion, at least partially disposed in the housing, which may be provided with a massage channel for accommodating a phallic member and an insertion opening for allowing the exemplary disclosed phallic member to enter and exit the massage channel. The exemplary disclosed sexual stimulation device may further include a sensor component, disposed within the housing, and configured to monitor changes in parameters related to a volume of the flexible massage portion caused by the movement of the exemplary disclosed phallic member in the massage channel, thereby providing data support for monitoring the movement of the exemplary disclosed phallic member.

Figure 1:
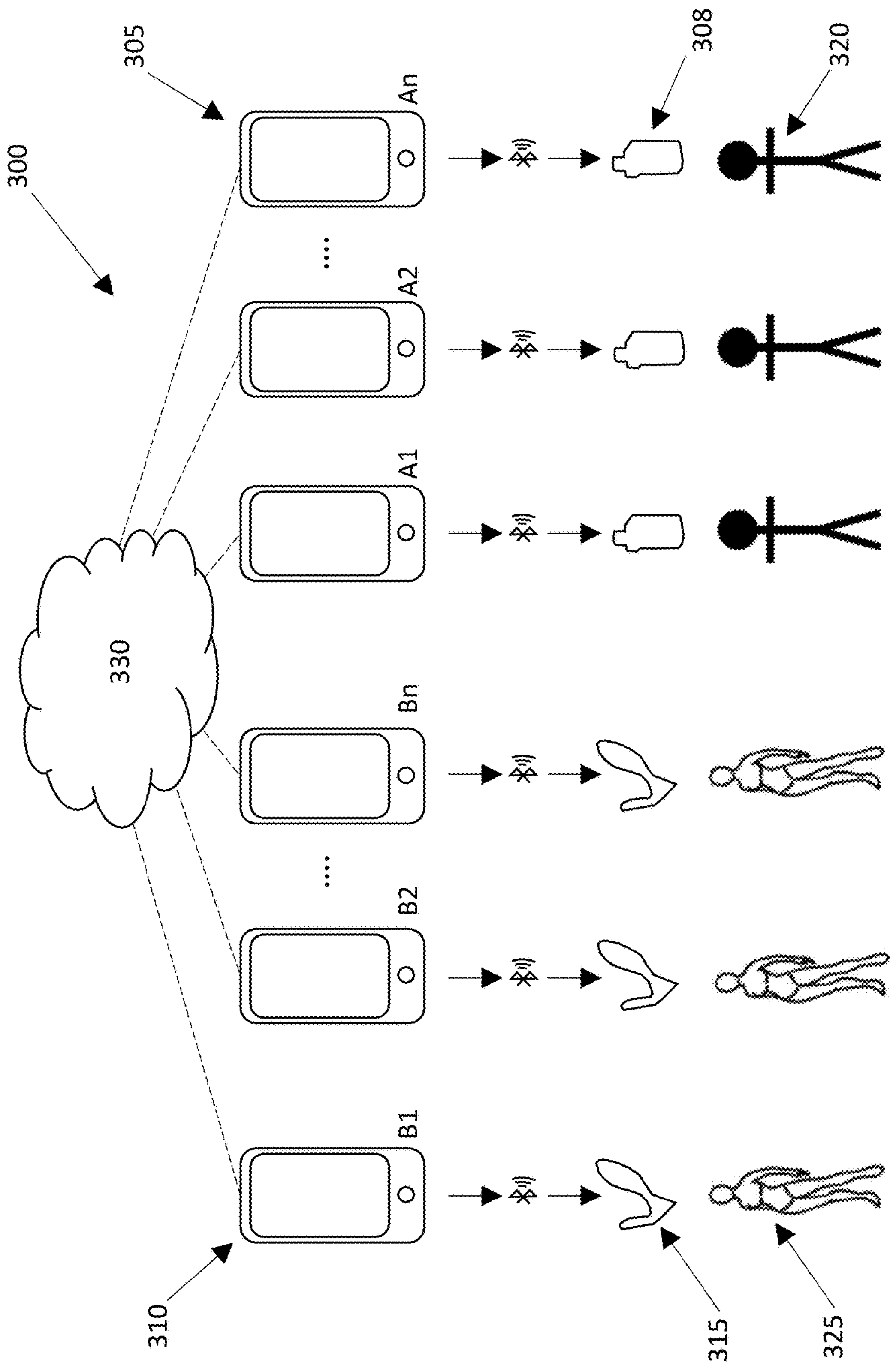
FIG. 1 is a schematic illustration of an exemplary system of the present invention.

As illustrated in FIG. 1, system 300 may include one or more male user devices 305, one or more female user devices 310, one or more male accessories 308, and/or one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315.

Returning to FIG. 1, system 300 may include any desired number of male user devices 305 (e.g., A1, A2, . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 18 and 19). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
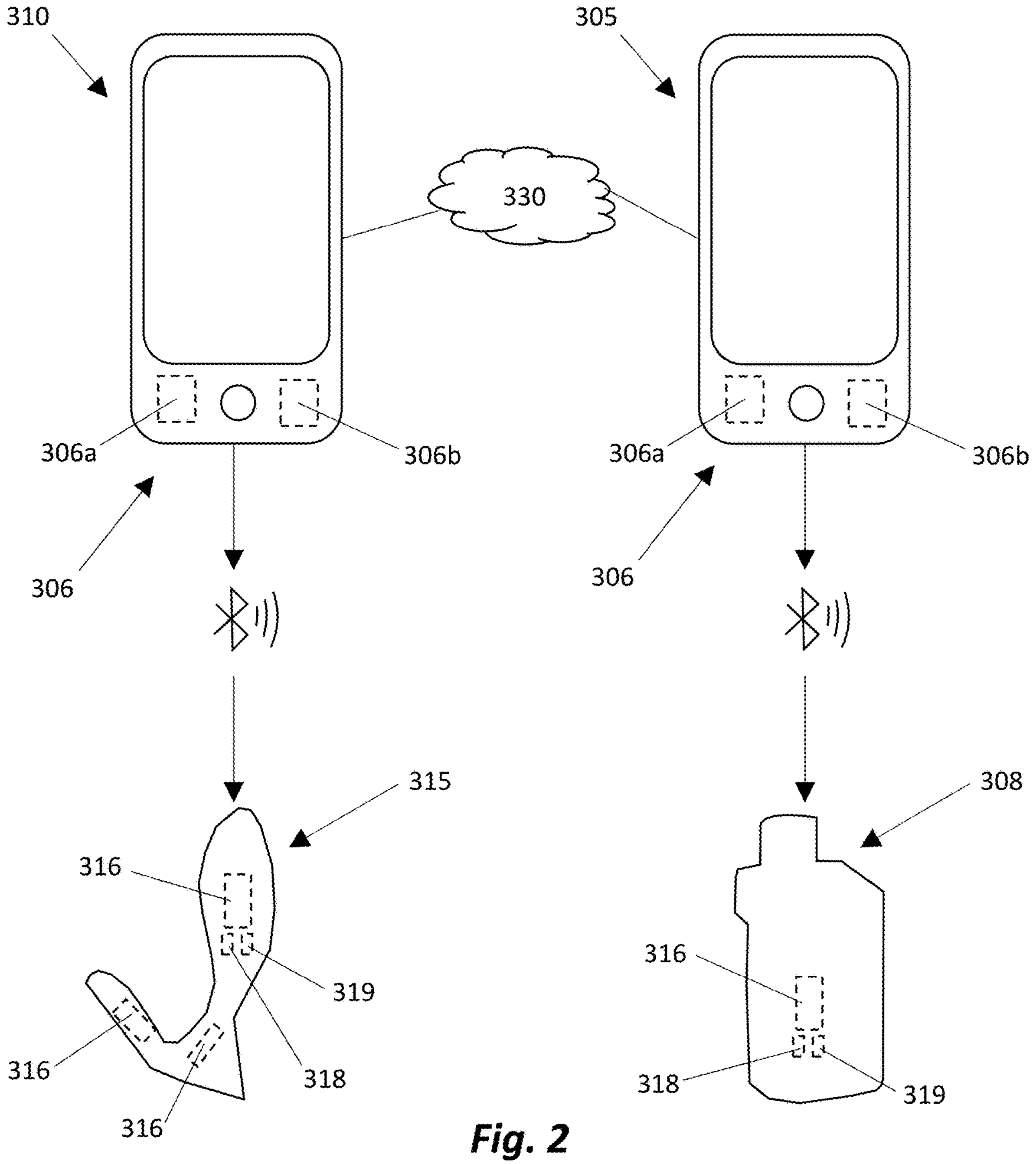
FIG. 2 is schematic illustration of exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306*a* and a movement sensor

306*b*. Location sensor 306*a* may include a GPS device, a Galileo device, a GLONASS device, an IRNSS device, a BeiDou device, and/or any other suitable device that may operate with a global navigation system.

Movement sensor 306*b* may include any suitable components for sensing motion (e.g., motion amplitude), velocity, and/or acceleration. Movement sensor 306*b* may include an acceleration sensor. Movement sensor 306*b* may include a gyroscope. For example, movement sensor 306*b* may include a displacement sensor, a velocity sensor, and/or an accelerometer. For example, movement sensor 306*b* may include components such as a servo accelerometer, a piezoelectric accelerometer, a potentiometric accelerometer, and/or a strain gauge accelerometer. Movement sensor 306*b* may include a piezoelectric velocity sensor or any other suitable type of velocity or acceleration sensor.

System 300 may include any desired number of female user devices 310 (e.g., B1, B2, . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, and/or any other desired role using any suitable female accessory 315.

Female accessory 315 may include one or more actuator mechanisms, for example, driving components such as one or more motors 316. Motor 316 may include an electric motor. Motor 316 may include a servomotor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 18. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, the exemplary disclosed actuator mechanism may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, the exemplary disclosed actuator mechanism may include an electric heating device such as an electric resistance heating device. The exemplary disclosed actuator mechanism may include a polyimide heater, a silicone rubber heater, and/or a resistive wire heater. The exemplary disclosed actuator mechanism may be controlled by controller 319 to heat or emit heat or warmth from female accessory 315. For example, the exemplary disclosed actuator mechanism may cause a temperature variation of female accessory 315.

Returning to FIG. 2, male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electromechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 19. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via WiFi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations such as, for example, the exemplary disclosed modules for example as described herein. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 18 and 19. For example, the exemplary disclosed buffer storage may include components similar to the exemplary storage medium and RAM described below regarding FIG. 18. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting and/or control an operation of the exemplary disclosed accessories.

Figure 3:
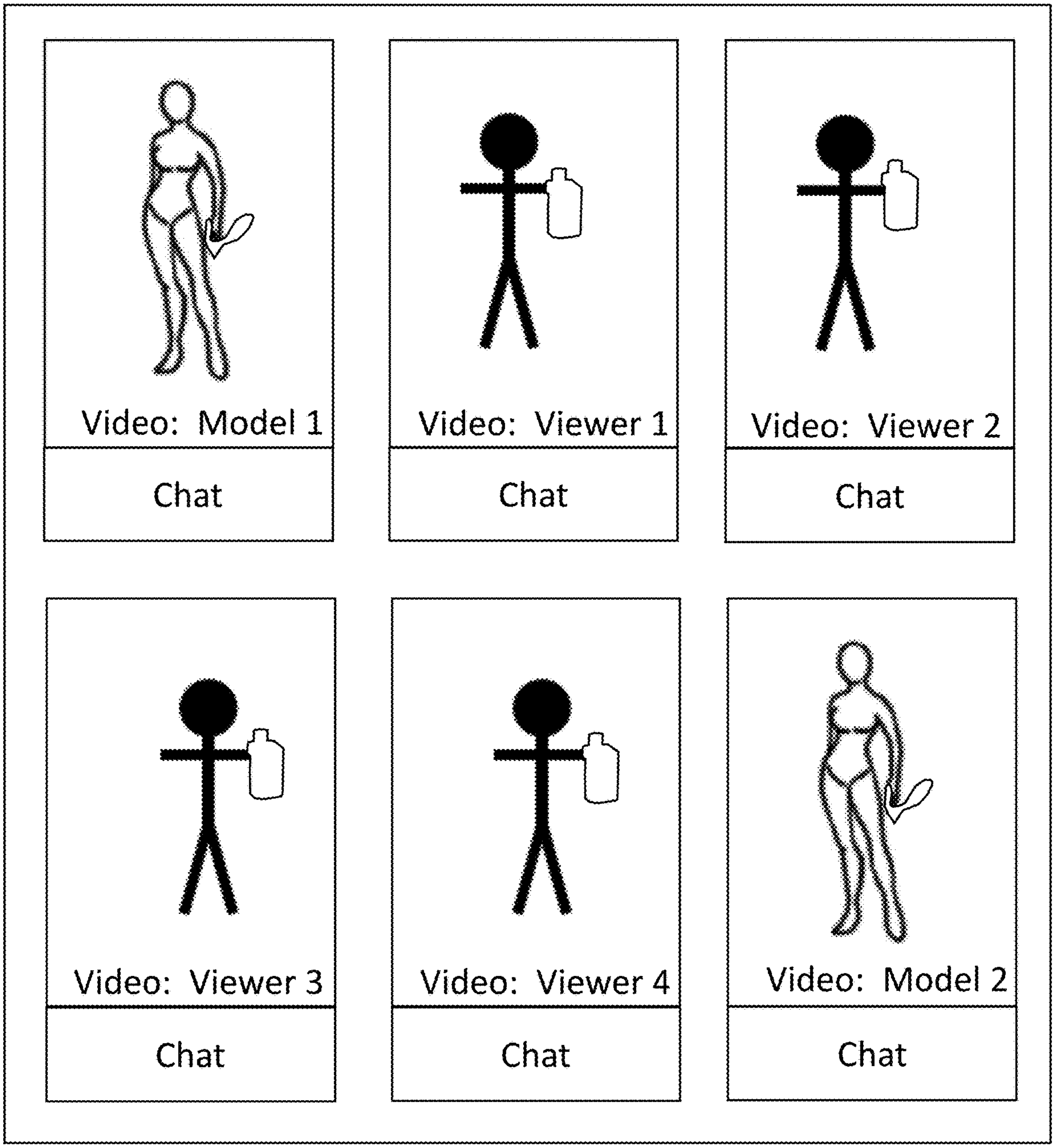
FIG. 3 is a schematic illustration of an exemplary embodiment of the exemplary disclosed system.

The one or more exemplary disclosed modules may also provide a chat room interface via one or more male user devices 305 and/or one or more female user devices 310 for use by male users 320 and female users 325. For example, a video display of female user 325, a video display of one or more male users 320, and/or and a graphical display of a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 and/or to female user 325 via female user device 310.

Figure 4:
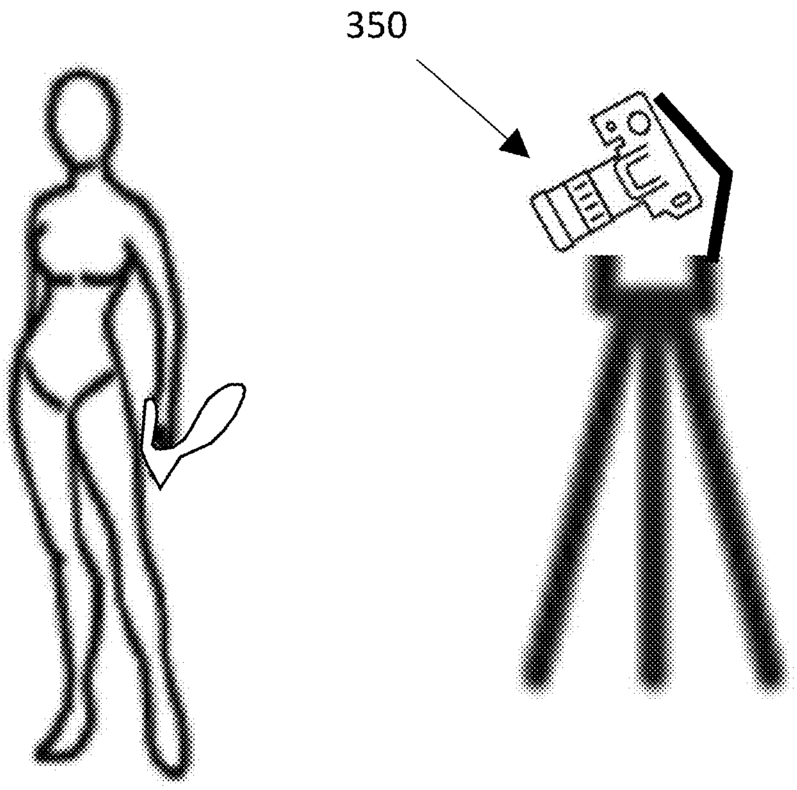
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

Figure 5:
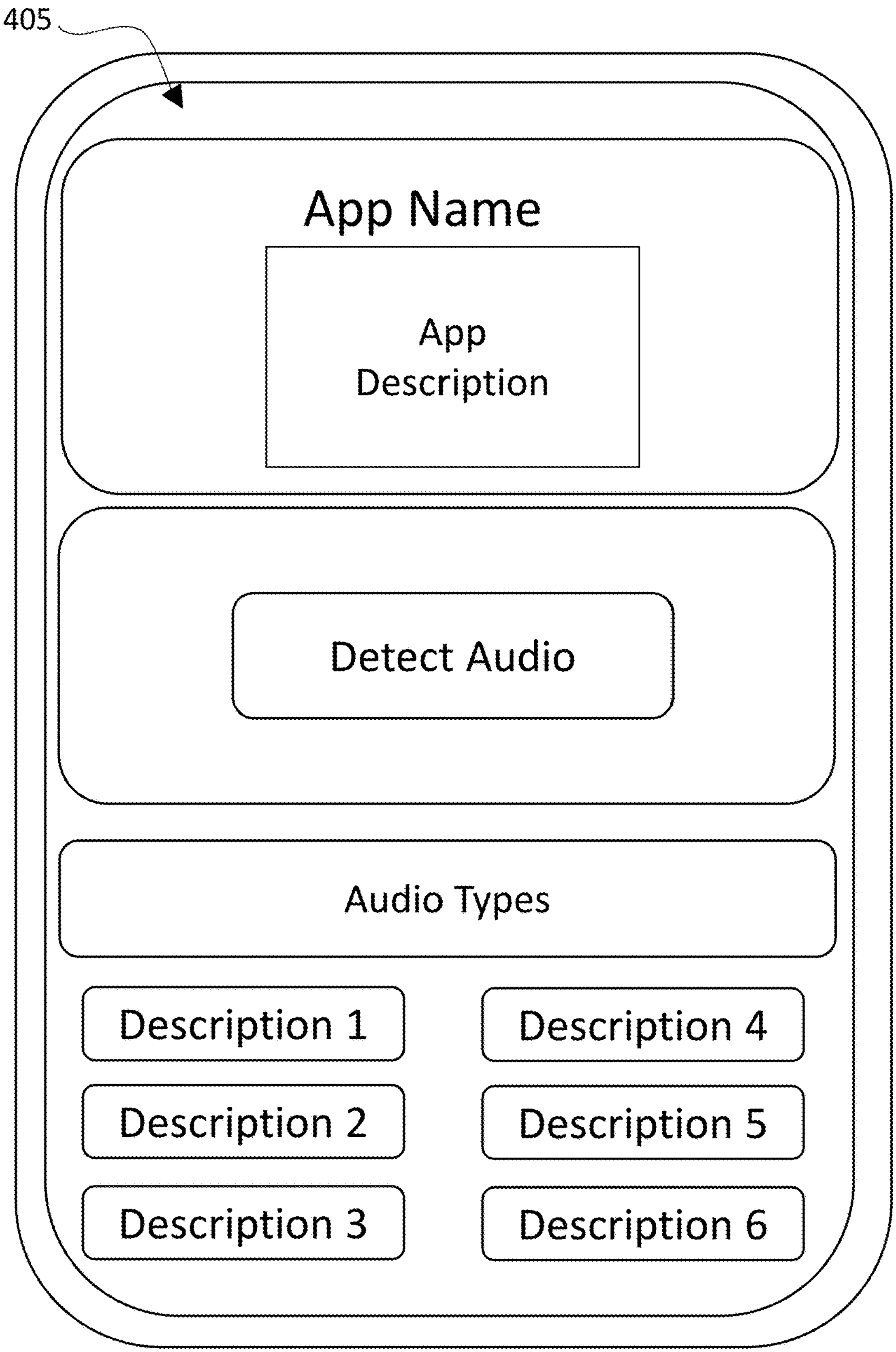
FIG. 5 is a schematic illustration of an exemplary embodiment of the exemplary disclosed system.
Figure 6:
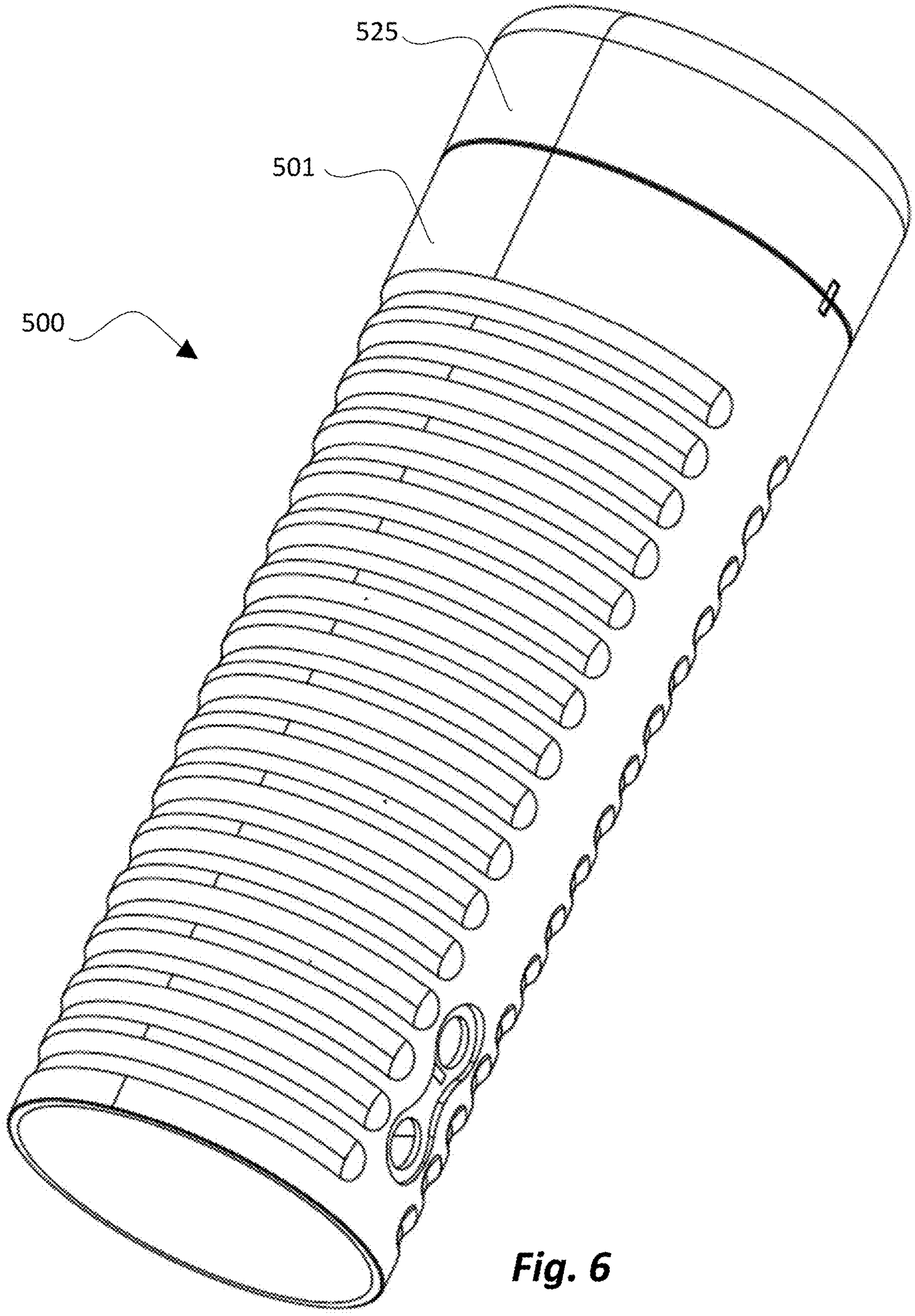
FIG. 6 is a perspective view of a first exemplary embodiment of the exemplary disclosed apparatus.
Figure 7:
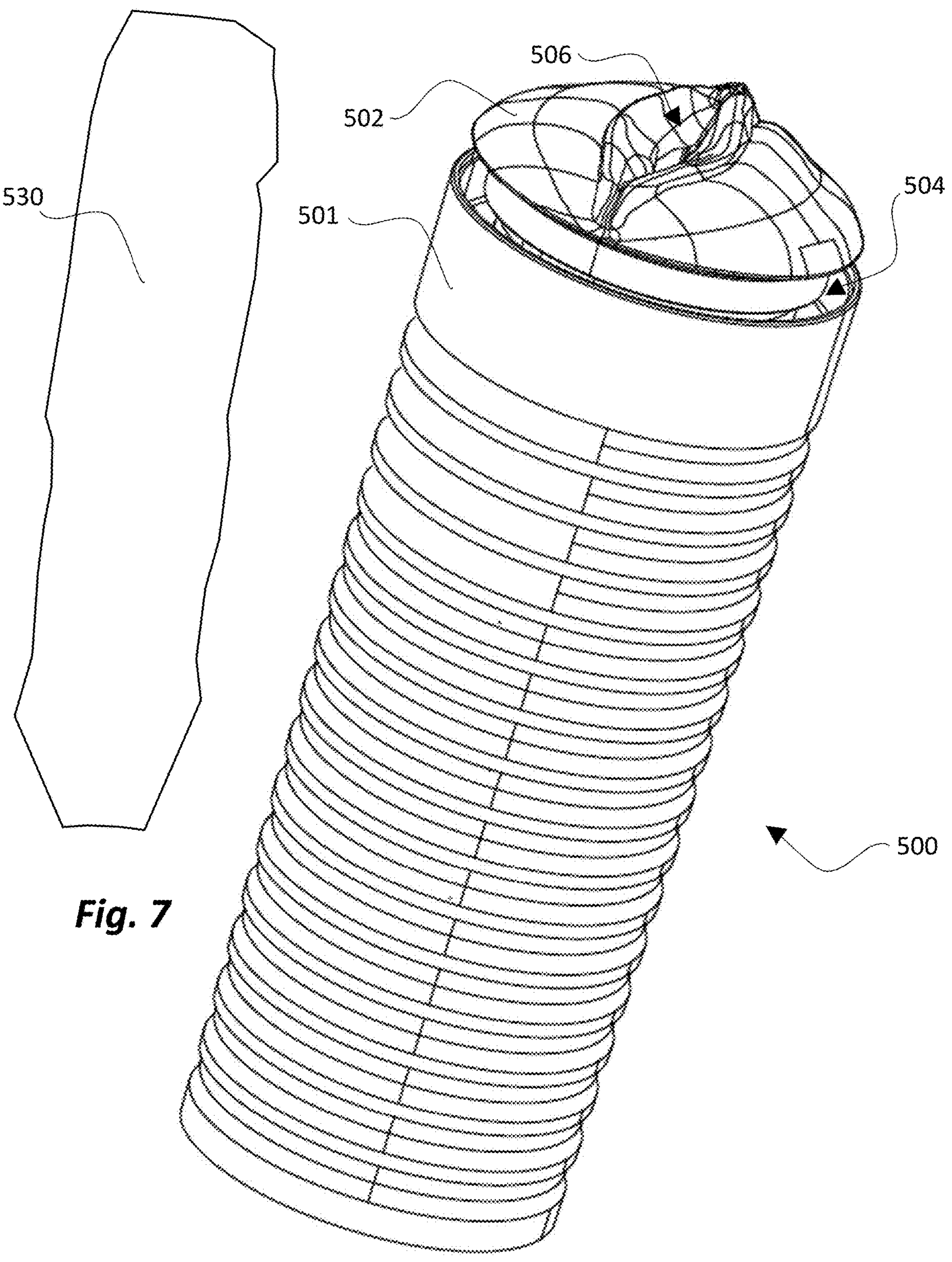
FIG. 7 is another perspective view when a cover is removed from the first exemplary embodiment of the exemplary disclosed apparatus.

In at least some exemplary embodiments and for example as illustrated in FIG. 5, graphical elements provided by system 300 may be displayed on a graphical user interface such as a GUI 405 on a display or touchscreen of the exemplary disclosed user device (e.g., male user device 305, female user device 310, and/or any other suitable user device) to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or models (e.g., one or more female users 325 and/or male users 320) via one or more exemplary disclosed user devices (e.g., one or more female user devices 310 and/or one or more male user devices 305, and/or any other suitable device).

FIGS. 6, 7, 8A, and 8B illustrate a first exemplary embodiment of the exemplary disclosed sexual stimulation device. The exemplary disclosed sexual stimulation device (e.g., a sexual stimulation device 500) may include components generally similar to male accessory 308 (e.g., and/or female accessory 315). The exemplary disclosed interactive sexual device may be used in system 300 described above, for example similarly to (e.g., used as or in place of) male accessory 308 (e.g., or female accessory 315). Sexual stimulation device 500 may include a housing 501, a flexible massage portion 502, and a sensor component 503. An opening 504 may be provided at an end portion (e.g., at an end) of housing 501. For example, at least one end portion of housing 501 may be provided with opening 504. Sexual stimulation device 500 may also include a layer 520 (e.g., a flexible layer formed from an elastic or flexible layer or coating) that may be received in housing 501 and that may form a layer disposed on flexible massage portion 502. For example, layer 520 may comprise a coating that may include light reflective materials as further described below. Alternatively for example, flexible massage portion 502 may be received in housing 501 without use of layer 520. Opening 504 of housing 501 may be selectively covered and uncovered by a cover 525 that may be removably attached to housing 501. Cover 525 may be removably attachable to housing 501 via any suitable removable attachment technique such as, for example, via a flange of cover 525 being snapped onto housing 501, having threading that may be threadably received on threading of housing 501, and/or any other suitable technique for removable attachment.

Housing 501 and cover 525 may be formed from any suitable structural material such as, for example, structural plastic and/or metal material. In at least some exemplary embodiments, housing 501 and cover 525 may be formed from plastic material such as High-Density Polyethylene (HDPE), Polypropylene (PP), Polyvinyl Chloride (PVC), Acrylonitrile-Butadiene-Styrene (ABS), Polycarbonate (PC), Polymethyl Methacrylate (PMMA), and/or any other suitable structural material. In at least some exemplary embodiments, exterior surfaces of housing 501 and/or cover 525 may be coated and/or covered with grippable material such as, for example, rubber or elastomeric material, plastic, polyurethane, plastisol, and/or any other suitable material to facilitate grasping of sexual stimulation device 500.

Flexible massage portion 502 may be formed from any suitable flexible (e.g., flexible and/or elastic) material. For example, flexible massage portion 502 may be formed from silicone material, thermoplastic elastomer material, and/or any other flexible material suitable for contact with a user's body parts such as a user's penis.

Figure 8A:
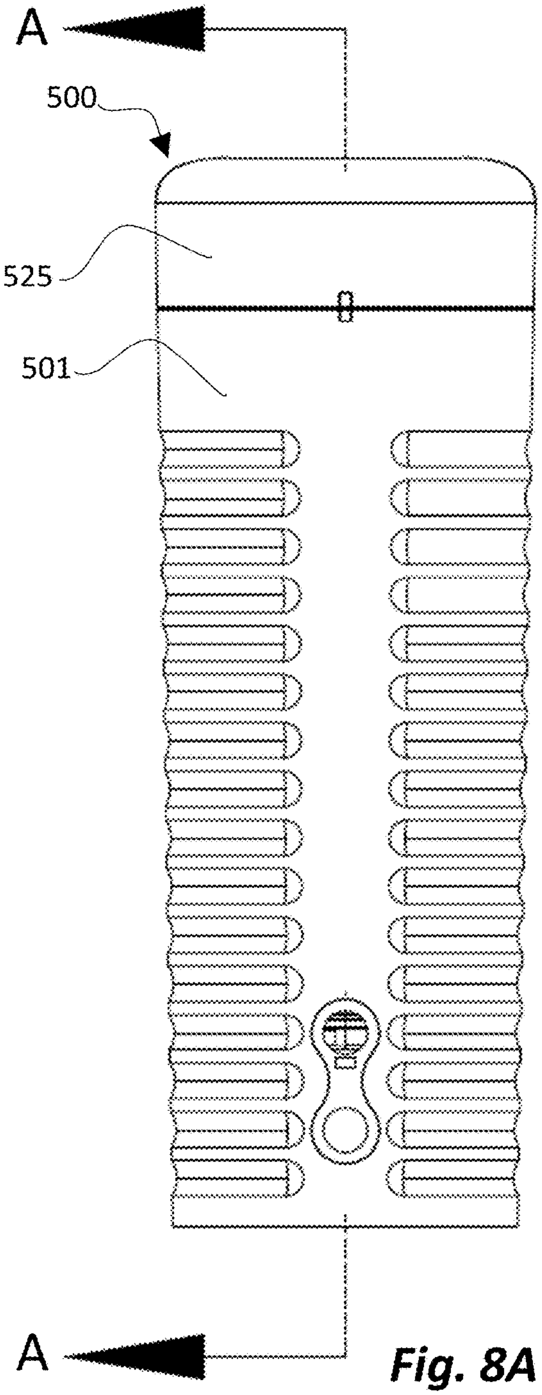
FIG. 8A is a front view of the first exemplary embodiment of the exemplary disclosed apparatus.
Figure 8B:
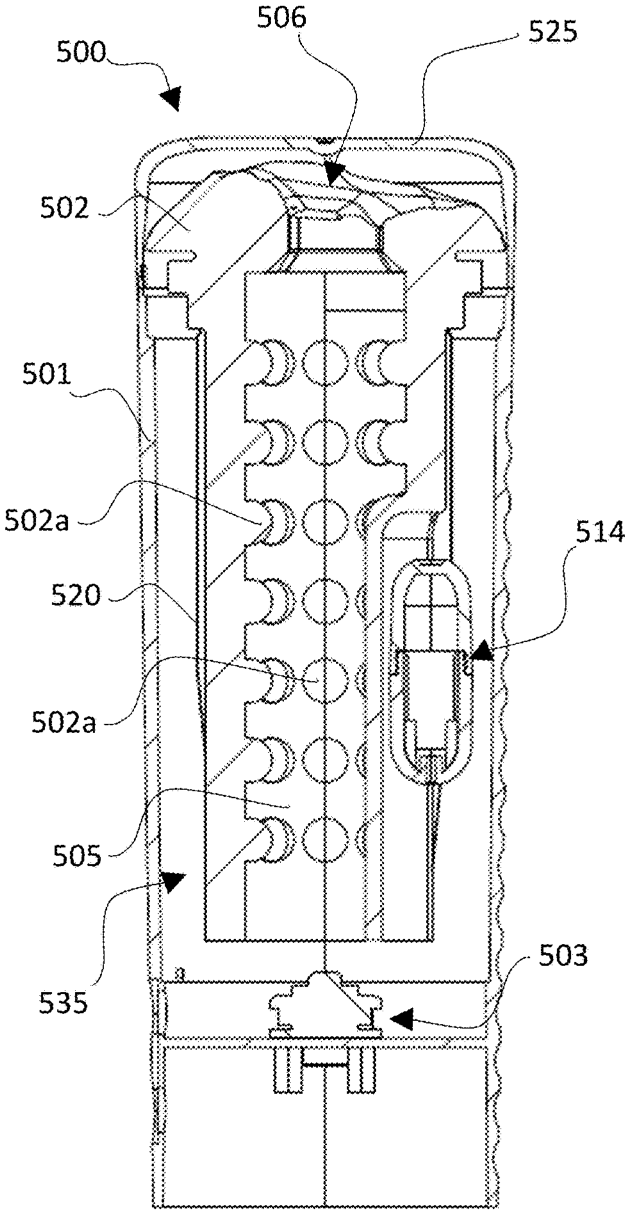
FIG. 8B is a sectional view, taken through section A-A of FIG. 8A, of the first exemplary embodiment of the exemplary disclosed apparatus.

Flexible massage portion 502 (e.g., that may or may not include layer 520 that may be a flexible layer or coating) may be supported by and at least partially disposed in housing 501. For example, a portion of flexible massage portion 502 may extend out of housing 501 via opening 504 of housing 501. Flexible massage portion 502 may include a massage channel 505 for accommodating the exemplary disclosed phallic member. Massage channel 505 may be a flexible massage channel comprising a cavity formed by flexible interior walls of a body of massage channel 505. For example, massage channel 505 may include a body having flexible walls that may be received in an aperture of flexible massage portion 502. Alternatively for example, massage channel 505 may be integrally formed with flexible massage portion 502. Massage channel 505 may be formed from similar material as described above regarding flexible massage portion 502. In at least some exemplary embodiments and for example as illustrated in FIG. 8B, flexible massage portion 502 may include protrusions 502*a* that may help to enhance stimulation effects.

Flexible massage portion 502 may also include an insertion opening 506 for allowing the exemplary disclosed phallic member to enter and exit massage channel 505. Sensor component 503 may be disposed within housing 501 and may be configured to monitor changes in parameters related to a volume of flexible massage portion 502 caused by the movement of the exemplary disclosed phallic member in massage channel 505, thereby providing data support for the exemplary disclosed system to monitor a movement of the phallic member.

Housing 501 may serve as an external main structure of sexual stimulation device 500, with opening 504 at one end of housing 501 facilitating the entry of the exemplary phallic member into the device via insertion opening 506. In at least some exemplary embodiments, a user of the sexual stimulation device may be a human, robot, adult toy, and/or any other suitable device that may provide similar sexual functions as humans. The exemplary disclosed phallic member (e.g., a phallic member 530 illustrated for example in FIG. 7) may be a penis, dildo, vibrator, or any other similar structure. Flexible massage portion 502 may be at least partially disposed in housing 501 and may form a portion of sexual stimulation device 500 that may be directly in contact with the exemplary disclosed phallic member (e.g., when phallic member 530 is inserted in flexible massage portion 502 via insertion opening 506). Massage channel 505 disposed inside of flexible massage portion 502 may simulate the female vagina, and may provide massage and/or stimulation functions (e.g., via the exemplary disclosed vibrator).

When the exemplary disclosed phallic member is moving (e.g., moving back and forth) in massage channel 505, the exemplary disclosed phallic member may cause changes in parameters related to a volume of flexible massage portion 502. Such changes in volume may include changes in a volume of flexible massage portion 502 itself due to morphological transformation of flexible massage portion 502 (e.g., changes in a volume, shape, and/or a density of portions of massage portion 502 due to interaction with the exemplary disclosed phallic member, including for example forces imparted by the exemplary disclosed phallic member that may cause compression, tension, and/or other forces that may change an overall volume and/or shape of flexible massage portion 502). Such changes in volume may also include changes in a relative volume formed between flexible massage portion 502 and housing 501 due to morphological transformation of flexible massage portion 502 itself. Such changes in volume may further include changes in relative volume (e.g., of a cavity 535) formed between flexible massage portion 502 and the exemplary disclosed phallic member (e.g., phallic member 530). Such changes in volume may also include changes in overall volume of flexible massage portion 502 and changes in local volume (e.g., of parts of flexible massage portion 502).

The exemplary disclosed system (e.g., sexual stimulation device 500) may monitor changes in parameters related to the volume of flexible massage portion 502 via a sensor (e.g., sensor component 503). The exemplary disclosed sensor may provide for real-time monitoring (e.g., real-time or near real-time monitoring) of volume changes of flexible massage portion 502 itself or volume changes of flexible massage portion 502 relative to other objects, substantially achieving real-time monitoring of the changes in flexible massage portion 502 (e.g., via three-dimensional monitoring for monitoring three-dimensional volume changes). The exemplary disclosed monitoring of volume may provide for data support for monitoring a movement of the exemplary disclosed phallic member (e.g., thereby substantially achieving relatively high-precision monitoring of the exemplary disclosed phallic member's movement). Sexual stimulation device 500 may thereby provide for substantially finely and accurately monitoring changes related to flexible massage portion 502 through multiple angles and multiple dimension (e.g., as compared to a method of linearly setting a series of sensors on a side of a flexible massage portion, or a method of detecting changes in a flexible massage portion in two dimensions, which may produce less accurate results than the exemplary disclosed system). Sexual stimulation device 500 may facilitate substantially accurate monitoring and calculation of various information, such as insertion depth of the exemplary disclosed phallic member, extraction frequency of the exemplary disclosed phallic member, expansion size of the exemplary disclosed phallic member, and/or changes in the squeezing force of the exemplary disclosed phallic member during insertion (e.g., insertion into massage channel 505 of flexible massage portion 502 via insertion opening 506).

In at least some exemplary embodiments, sensor component 503 may be an optical sensor component (e.g., an optical scanning sensor or a structured light scanner), a stereoscopic vision sensor component, a liquid level measurement sensor component, a pressure measurement sensor component, a lidar, a millimeter-wave radar, an ultrasonic sensor and/or a stereo camera. For example, sensor component 503 may be an optical sensing component that may be a non-contact tactile device that may obtain data (e.g., three-dimensional data such as dense three-dimensional point cloud data) related to flexible massage portion 502 during a movement of the exemplary disclosed phallic member through lasers or light spots (e.g., associated with sensor component 503). Sensor component 503 that may be a stereoscopic vision sensor component may mimic human eyes and capture parallax data related to flexible massage portion 502 (e.g., from different angles using different cameras). Sensor component 503 that may be a liquid level measurement sensor component may obtain relevant information regarding flexible massage portion 502 by measuring a height of a fluid (e.g., liquid) disposed between housing 501 and flexible massage portion 502. For example as illustrated in FIG. 8B, a fluid may be disposed in cavity 535 of housing 501 formed between an interior wall of housing 501 and an exterior of flexible massage portion 502 (e.g., or layer 520 that may be a flexible layer or coating). Sensor component 503 that may be a pressure measurement sensor component may obtain information related to flexible massage portion 502 by measuring a pressure of fluid disposed between an interior wall of housing 501 and an exterior wall of flexible massage portion 502 (e.g., or layer 520 that may be a flexible layer or coating). The exemplary disclosed fluid may be for example water, gel, a viscous fluid, and/or any other suitable fluid for measuring a height change of the fluid. In some exemplary embodiments, the sexual stimulation device may comprise at least a pressure sensing airbag that may be disposed within the flexible massage portion, and the sensor component may be a pressure sensor that is configured to monitor the changes in the volume of the flexible massage portion itself based on morphological transformation of the flexible massage portion. In some exemplary embodiments, the sensor component may be disposed in the flexible massage portion (e.g., in the massage channel) to monitor changes in a relative volume formed between the flexible massage portion and the phallic member. Sensor component 503 that may be an ultrasonic sensor may obtain information related to flexible massage portion 502 by utilizing ultrasonic waves. The ultrasonic sensor may be a compact component that achieves short-range detection by emitting ultrasonic waves and calculating the ultrasonic waves' return time to measure distance.

In at least some exemplary embodiments, sensor component 503 may be a rotatable optical sensor component. Sensor component 503 that may be a rotatable optical sensor component may include an optical element and a rotating component configured to drive the optical component to rotate. The optical element may be a laser or an infrared sensor. For example, the exemplary disclosed optical element may be a laser sensor. The exemplary disclosed laser sensor may be a substantially high-precision distance-measuring sensor that may emit a laser with relatively high directionality, single wavelength, and concentrated features (e.g., concentrated ability). The exemplary disclosed laser sensor may thereby achieve substantially ultra-high precision measurement results and may have a relatively fast response speed. For example if (e.g., even if) the exemplary disclosed phallic member moves relatively rapidly inside flexible massage portion 502, a monitoring result of the exemplary disclosed laser sensor may remain substantially stable and accurate, which may provide substantially accurate monitoring of changes in parameters related to the volume of flexible massage portion 502. The exemplary disclosed monitoring may facilitate substantially accurate analysis of the movement and changes of the exemplary disclosed phallic member in flexible massage portion 502. For example, sensor component 503 that may be a rotatable optical sensor component may be a rotary laser scanning radar or a rotary laser sensor. The exemplary disclosed rotary laser scanning radar or rotary laser sensor may provide multi-point distance data (e.g., three-dimensional measurement) to provide three-dimensional scanning and thereby more substantially accurately and reliably monitor (e.g., reflect) changes in the volume of flexible massage portion 502 itself or a volume of flexible massage portion 502 relative to a volume of other components (e.g., as compared to single direction distance sensors such as two-dimensional measurement sensors, which may produce less accurate results than the exemplary disclosed system).

Figure 9:
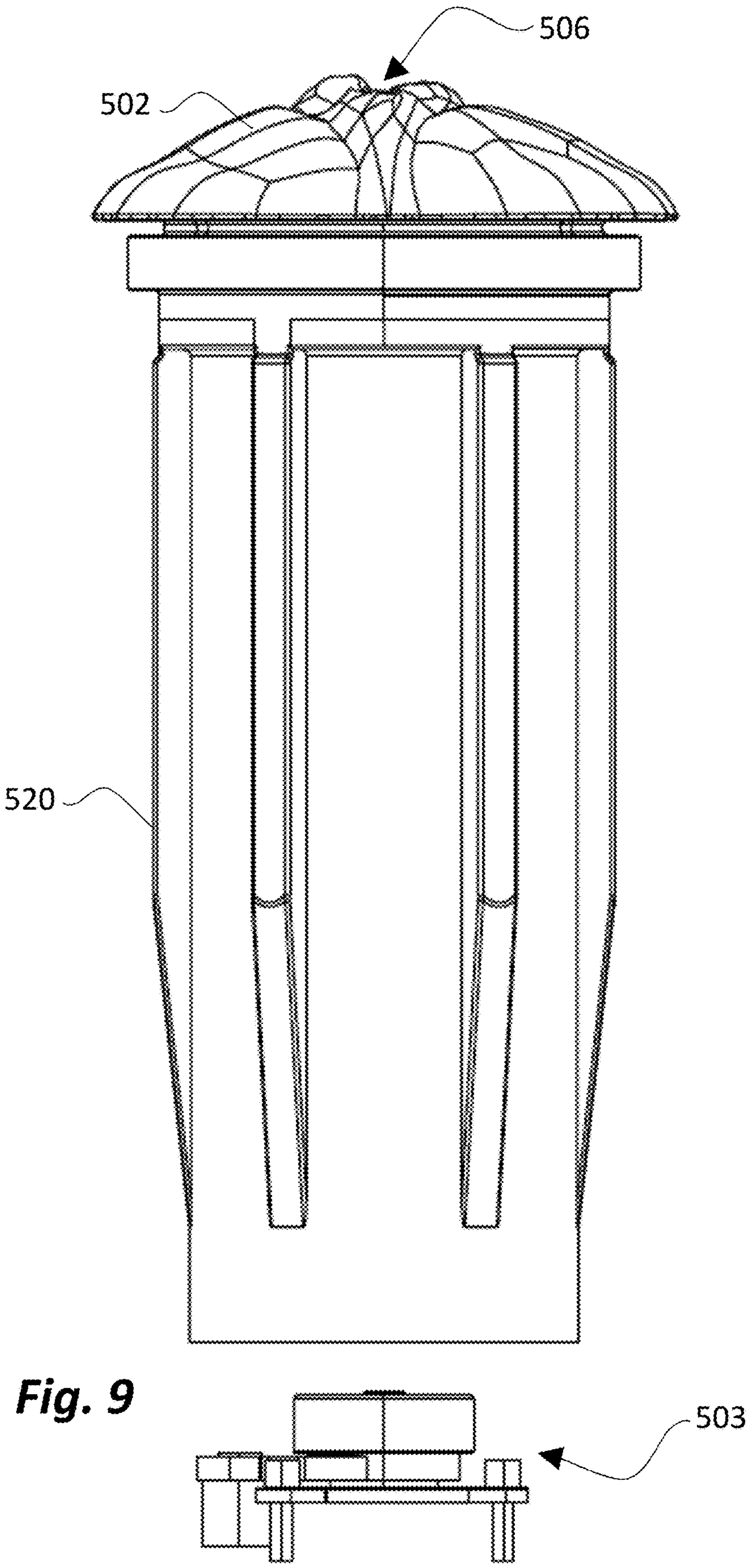
FIG. 9 is a side view of an exemplary disclosed flexible massage portion and an exemplary disclosed sensor component of the first exemplary embodiment of the exemplary disclosed apparatus.
Figure 10A:
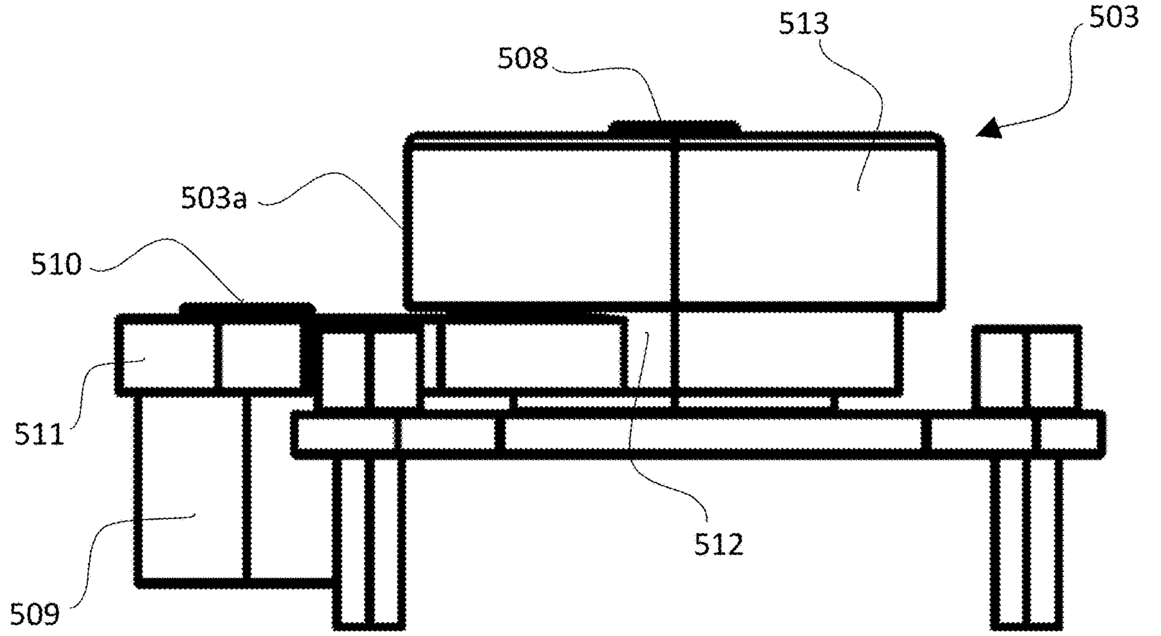
FIG. 10A is a detailed, side view of the exemplary disclosed sensor component of the first exemplary embodiment of the exemplary disclosed apparatus.
Figure 10B:
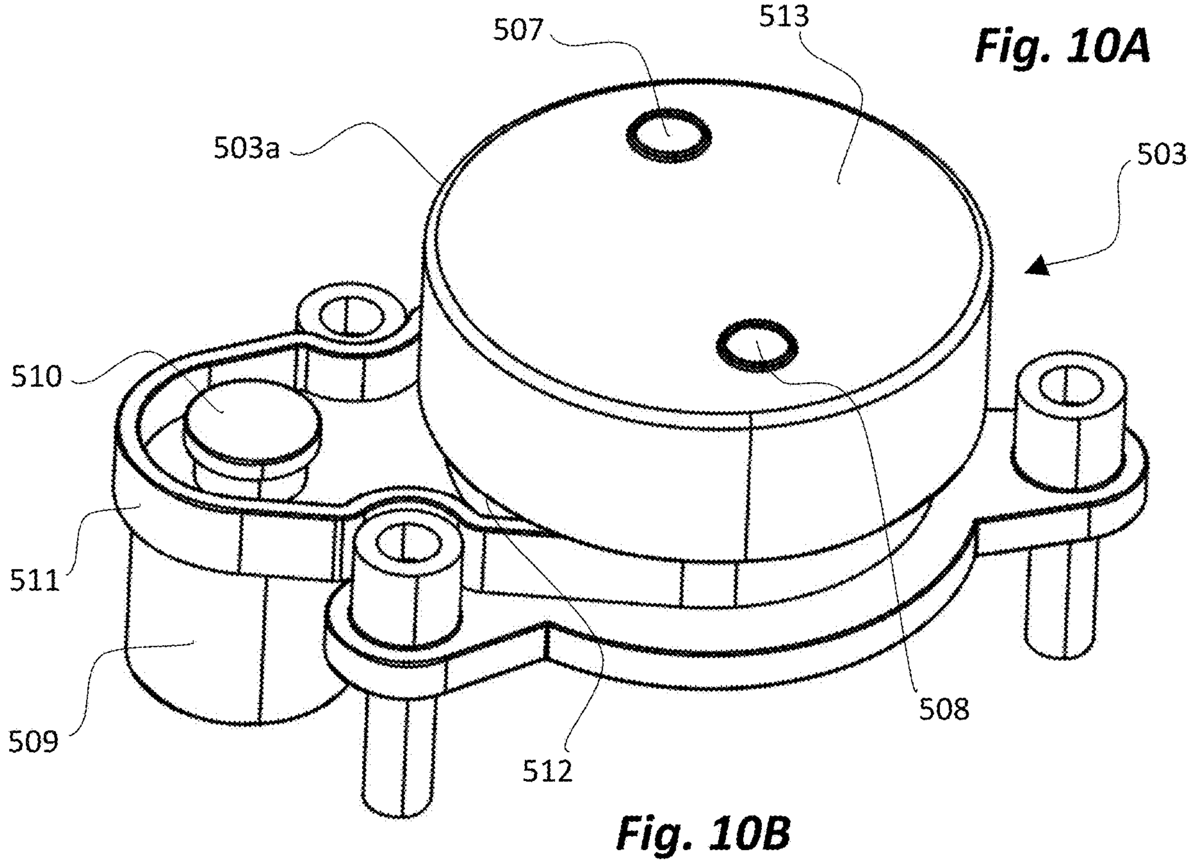
FIG. 10B is a perspective view of the exemplary disclosed sensor component of the first exemplary embodiment of the exemplary disclosed apparatus.
Figure 11A:
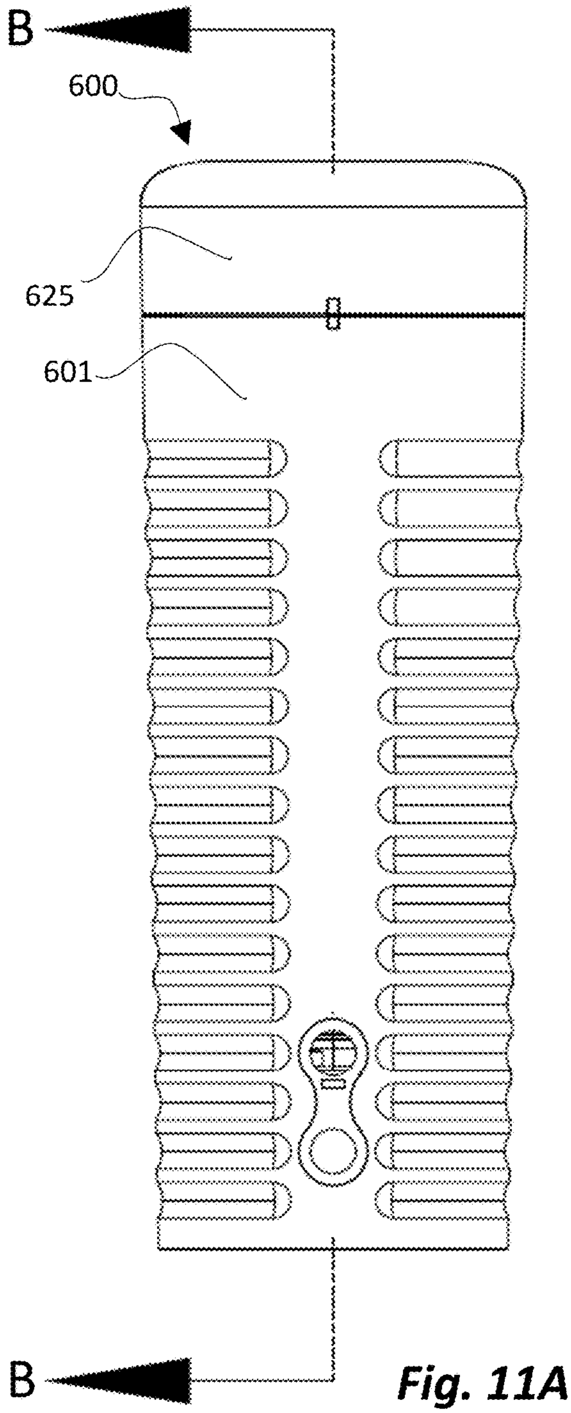
FIG. 11A is a front view of a second exemplary embodiment of the exemplary disclosed apparatus.
Figure 11B:
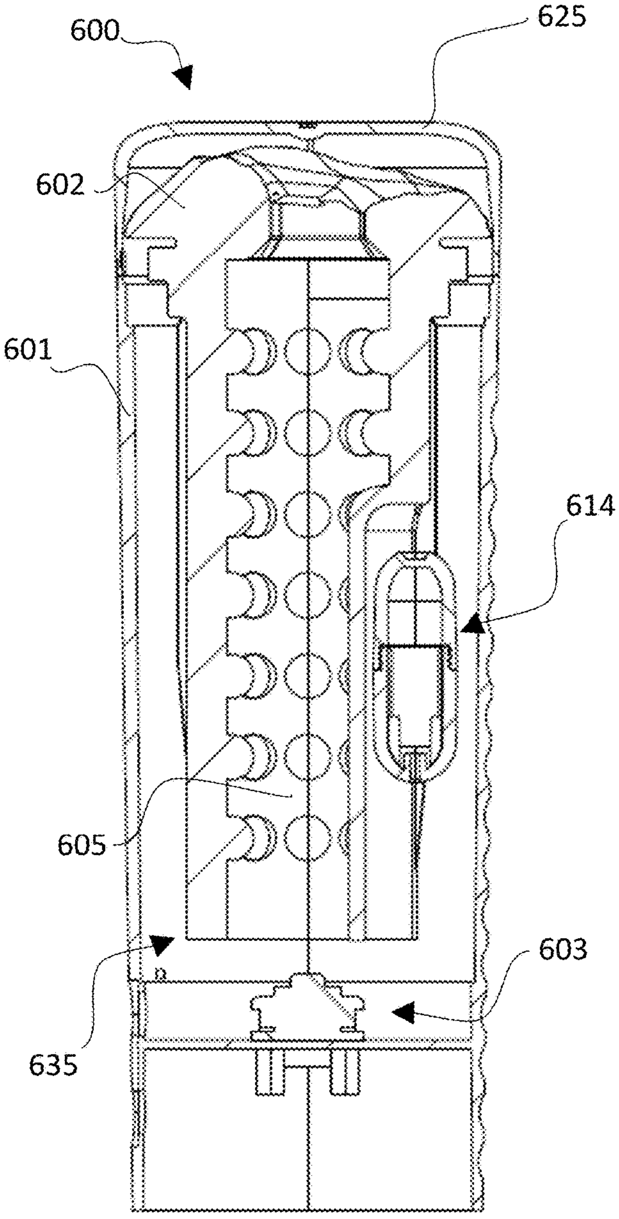
FIG. 11B is a sectional view, taken through section B-B of FIG. 11A, of the second exemplary embodiment of the exemplary disclosed apparatus.

In at least some exemplary embodiments (e.g., as an optional implementation of the first exemplary embodiment) and as illustrated in FIGS. 9, 10A, and 10B, sensor component 503 may be a rotatable optical sensor component such as a rotary laser sensor. FIG. 9 illustrates flexible massage portion 502 and sensor component 503 with housing 501 removed for clarity, and FIGS. 10A and 10B illustrate detailed views of sensor component 503. In at least some exemplary embodiments, sensor component 503 may be a rotary laser sensor including a rotating element and a laser optical element 513. The exemplary disclosed rotating element may include a rotating motor 509, a rotating structure such as a rotating disk 512, a pulley 510, and a transmission belt 511. An output end of rotating motor 509 may be provided with pulley 510. Rotating motor 509 may be any suitable type of motor such as, for example, similar to motor 316 described above. A peripheral surface of pulley 510 may be wrapped by transmission belt 511 (e.g., transmission belt 511 may be wrapped around the peripheral surface of pulley 510). Rotating disk 512 may be connected to pulley 510 via transmission belt 511. Laser optical component 513 may be disposed on rotating disk 512. When rotating motor 509 operates (e.g., rotates), rotating motor 509 may drive (e.g., sequentially drive) pulley 510, which may cause transmission belt 511 and rotating disk 512 to rotate, thereby causing laser optical element 513 supported by rotating disk 512 to rotate.

In at least some exemplary embodiments, the exemplary disclosed optical sensor component (e.g., laser optical component 513) may include a laser emitter and a laser receiver. For example, laser optical component 513 may include a laser emitter 507 and a laser receiver 508. In at least some exemplary embodiments, laser optical component 513 including laser emitter 507 and laser receiver 508 may form an infrared laser sensor that operates according to the following steps. Laser emitter 507 may emit a laser beam (e.g., an extremely fine infrared laser beam). Then, rotating scanning may be performed based on laser emitter 507 and laser receiver 508 rotating at a relatively high speed on a same plane, which may allow the generated laser beam to scan the surrounding environment (e.g., 3600 scanning such as, for example, similar to a lighthouse emitting light). Then, reflection reception may be performed based on the generated laser beam (by laser emitter 507) encountering obstacles (e.g., flexible massage portion 502, housing 501, and/or other obstacles) and the laser beam may reflect back (e.g., to be received by laser receiver 508). Then, a distance may be calculated based on laser receiver 508 receiving the reflected light, and the exemplary disclosed system (e.g., via the exemplary disclosed controller and modules described herein) substantially accurately calculating the distance to the obstacles by calculating the time it takes for the laser to emit from laser emitter 507 and to return to laser receiver 508. For example, the distance may be calculated using the "time of flight method" in which the distance=(speed of light×time difference)/2, wherein the time difference $\Delta t = t2 - t1$ (wherein t2 is a time point when the laser returns, and t1 is a time point when the laser is emitted), and $\Delta t$ is the time it takes for the laser to travel back and forth once. Then, the exemplary disclosed system (e.g., via the exemplary disclosed controller and modules described herein) may build a map. For example, the exemplary disclosed control module may combine the distance data of collected data (e.g., many data points each containing angle and distance information) to form a point cloud map of the surrounding environment using the exemplary disclosed processor, which may form a map (e.g., clear map) that may be viewed using the exemplary disclosed user device described herein (e.g., mobile phone or computer).

In at least some exemplary embodiments, a scanning range of the exemplary disclosed optical sensor component (e.g., sensor component 503) may be less than a preset threshold, so that the scanning range of the exemplary disclosed optical sensor component may cover (e.g., focus on) flexible massage portion 502 and not components outside of flexible massage portion 502. For example in at least some exemplary embodiments, a scanning range of the optical sensor component (e.g., sensor component 503) may be less than a preset threshold, so that the scanning range of the optical sensor component covers (e.g., only covers) the exemplary disclosed flexible massage portion. Such a configuration may provide for calculating and analyzing (e.g., via the exemplary disclosed controller) a movement of the exemplary disclosed phallic member by monitoring the changes (e.g., volume changes) in flexible massage portion

Figure 20:
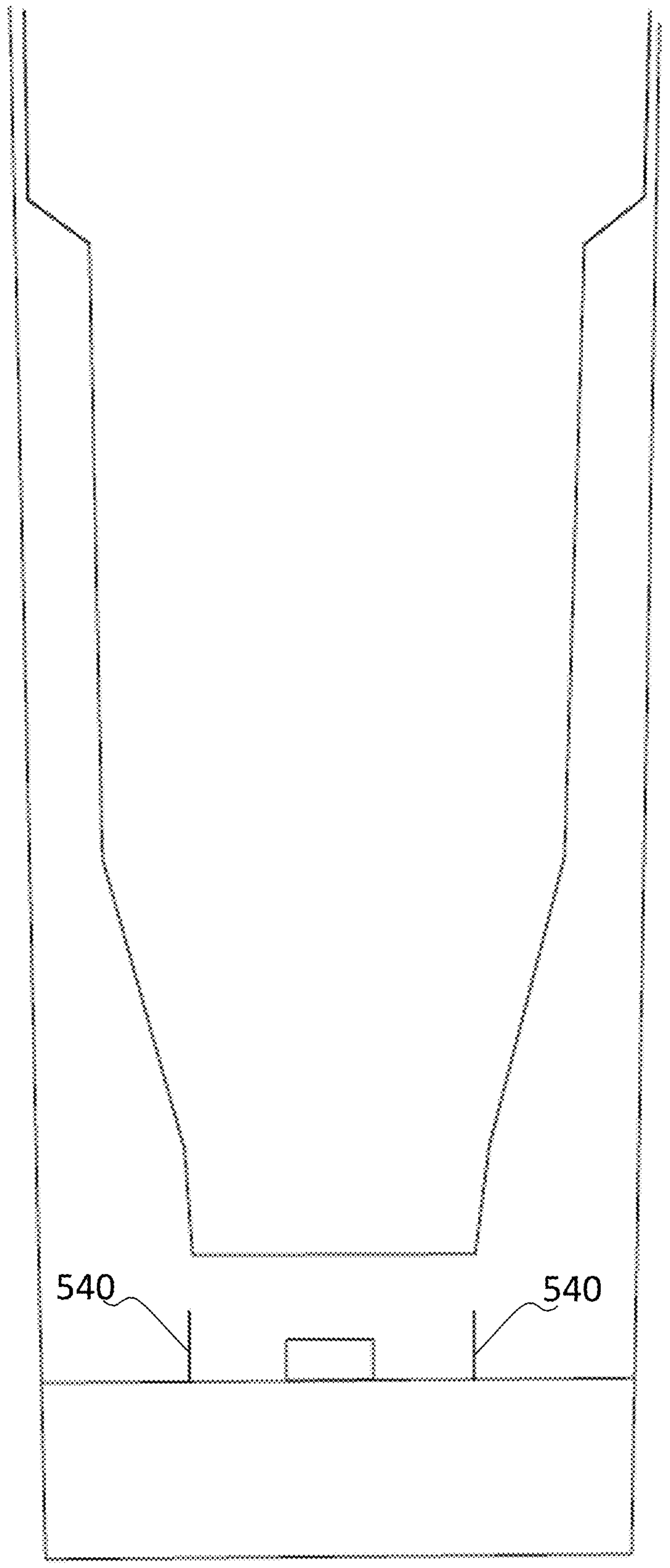
FIG. 20 is a schematic illustration of sectional view of components including an exemplary disclosed optical element and blocking element of the exemplary disclosed apparatus.

502. Also for example, a peripheral side of the exemplary disclosed optical sensor component (e.g., sensor component 503) may be provided with a blocking element (e.g., or any other suitable technique for reducing a range of beam emission angles of the exemplary disclosed optical sensor component) such as blocking element 540 schematically illustrated in FIG. 20. A light absorbing layer may be provided at (e.g., integrated into) the exemplary disclosed blocking element. The exemplary disclosed blocking elements may substantially prevent light from shining on non-target areas (e.g., areas other than flexible massage portion 502), thereby substantially avoiding an effect (e.g., an impact) of reflected light from non-target areas on a monitoring result obtained by the exemplary disclosed system. In at least some exemplary embodiments, blocking element 540 may be configured to limit a range of beam emission angles of the exemplary disclosed optical sensor component (e.g., sensor component 503). Blocking element 540 may be a light blocking plate.

In at least some exemplary embodiments, a monitoring method is disclosed. The exemplary disclosed monitoring method comprises monitoring a sexual stimulation device that includes a massage portion configured to apply sexual stimulation to at least a genital portion of a user, and a sensor component, which is configured to monitor changes in parameters related to the massage portion caused by a relative movement of the massage portion and the genital portion, thereby providing data support for monitoring the relative movement of the massage portion and the genital portion. The genital portion may be penis, dildo, vagina or vaginal replica, etc. In at least some exemplary embodiments, the exemplary disclosed sexual stimulation device may be a male sexual stimulation device, the massage portion may be a flexible massage portion that imitates structure of a vagina (e.g., a vaginal replica), and the genital portion may be a penis or a dildo. The exemplary disclosed monitoring method of monitoring changes in parameters related to the exemplary disclosed massage portion (e.g., flexible massage portion 502) may include the following steps. First, static data acquisition may be performed based on the exemplary disclosed system obtaining static three-dimensional data related to the flexible massage portion (e.g., static three-dimensional data of the volume of the vaginal replica itself) in a non-working state (e.g., when the exemplary disclosed phallic member is not inserted in the exemplary disclosed flexible massage portion) using the exemplary disclosed sensor component (e.g., sensor component 503). The exemplary disclosed data may include static three-dimensional data that may be in the form of multi-frame point clouds. Next, target data acquisition may be performed based on obtaining real-time (e.g., real-time or near real-time) three-dimensional data related to flexible massage portion 502 (e.g., real-time three-dimensional data of the volume of the vaginal replica itself) in a working state (e.g., when the exemplary disclosed phallic member is inserted in the exemplary disclosed flexible massage portion) using sensor component 503. The exemplary disclosed system may compare the real-time three-dimensional data with the static three-dimensional data described above to determine a target three-dimensional data that has undergone changes (e.g., volume changes). For example, the exemplary disclosed target data acquisition may include obtaining the real-time three-dimensional data related to the flexible massage portion in the working state using sensor component 503 when the exemplary disclosed phallic member is moving in massage channel 505, comparing each frame point cloud of the real-time three-dimensional data with the static three-dimensional data, and eliminating point clouds that overlap with point clouds of the static three-dimensional data (e.g., remaining point clouds may be determined/retained as the target three-dimensional data). The real-time three-dimensional data may be for example multi-frame point clouds. Next, analysis may be performed based on the target three-dimensional data, including analyzing and obtaining the motion trajectory of flexible massage portion 502 (e.g., a direction or directions in which portions of flexible massage portion 502 move). For example, the analysis may include performing clustering algorithm on the remaining point clouds (e.g., remaining points of the point clouds), dividing the remaining point clouds (e.g., points) into multiple independent target groups, and analyzing the motion trajectory of the target groups to obtain the motion trajectory of flexible massage portion 502 (namely obtain the motion trajectory of the vaginal replica). In some exemplary embodiments, three-dimensional data related to the flexible massage portion may be three-dimensional data related to a relative volume formed between the flexible massage portion (e.g., a vaginal replica) and the housing, or three-dimensional data related to the flexible massage portion may be three-dimensional data related to a relative volume formed between the flexible massage portion (e.g., a vaginal replica) and the genital portion (e.g. a penis or a dildo). In some exemplary embodiments, the exemplary disclosed sexual stimulation device may be a female sexual stimulation device, the massage portion may be a rod-shaped massage portion that imitates structure of a penis (e.g., a dildo), and the genital portion may be a vagina. Changes in parameters related to the exemplary disclosed massage portion may be relative position or relative volume of the rod-shaped massage portion and the vagina. The sensor component may be disposed adjacent to a proximal end section of the rod-shaped massage portion. The exemplary disclosed monitoring method of monitoring changes in parameters related to the exemplary disclosed massage portion (e.g., dildo) may include the following steps. First, static data acquisition may be performed based on the exemplary disclosed system obtaining static three-dimensional data related to the dildo (e.g., static three-dimensional data of a relative position of the dildo and the vagina) in a non-working state (e.g., when the exemplary disclosed dildo is not inserted in the vagina) using the exemplary disclosed sensor component. Next, target data acquisition may be performed based on obtaining real-time (e.g., real-time or near real-time) three-dimensional data related to massage portion (e.g., real-time three-dimensional data of a relative position of the dildo and the vagina) in a working state (e.g., when the exemplary disclosed dildo is inserted in the vagina) using the sensor component. The exemplary disclosed system may compare the real-time three-dimensional data with the static three-dimensional data described above to determine a target three-dimensional data that has undergone changes (e.g., relative position changes). Next, analysis may be performed based on the target three-dimensional data, including analyzing and obtaining motion trajectory of the massage portion (e.g., dildo), which may be similar to the analysis of the target three-dimensional data of the exemplary disclosed male sexual stimulation device described above.

In at least some exemplary embodiments, the exemplary disclosed sensor component (e.g., sensor component 503) may be disposed between housing 501 and flexible massage portion 502. For example, sensor component 503 that may be a rotatable laser sensor may be disposed between housing 501 and flexible massage portion 502. In this exemplary configuration, laser light may not illuminate to the exemplary disclosed phallic member (e.g., a penis of the user), thereby avoiding laser hazards to the human body and maintaining safety of the user.

In at least some exemplary embodiments, in order to improve monitoring precision of sensor component 503 (e.g., an optic sensor component), light reflective materials may be disposed on the surface of flexible massage portion 502 (e.g., layer 520 that may comprise a coating layer that includes light reflective materials). The exemplary disclosed light reflective materials may enhance an intensity of reflected signal (e.g., emitted laser beam), making the signal received by laser receiver 508 stronger and increasing an accuracy of the monitoring data. The exemplary disclosed light reflective materials may include metalized thin films, liquid metal coatings, flexible multilayer dielectric optical thin films, and/or any other suitable materials that may have suitable (e.g., good) reflectivity, flexibility, and/or stretchability. For example, the metalized thin films may be obtained by vacuum coating or magnetron sputtering technology. For the exemplary disclosed liquid metal coatings, the liquid metal may be made into nanoparticles dispersed in solvent and may be applied to flexible massage portion 502 (e.g., forming layer 520 that may be a coating) via spraying, brushing, printing, and/or other methods. Subsequently, the coating may be slightly heated (e.g., by machine heating) to break the connection and form a continuous conductive reflective mirror surface. Alternatively for example, the liquid metal may be coated onto flexible massage portion 502 (e.g., forming layer 520 that may be a coating) when flexible massage portion 502 is stretched. After relaxation of flexible massage portion 502, micro wrinkles may form on the surface of flexible massage portion 502, which may be unfolded during subsequent stretching to substantially ensure that the conductivity and reflectivity of the metal layer are not compromised. The exemplary disclosed liquid metal material may have extreme flexibility and stretchability, and may even withstand over 100% tensile strain while maintaining its function (e.g., with a reflectivity close to that of bulk metals). For the exemplary disclosed flexible multilayer dielectric optical thin films, such films may utilize transparent dielectric materials with different refractive indices (e.g., $SiO_2$, $TiO_2$, or $Ta_2O_3$) alternately deposited to form multilayer structures, achieving nearly 100% reflection of specific wavelengths through the interference effect of light. Advanced vacuum coating techniques such as electron beam evaporation and/or ion-assisted deposition may be used, resulting in relatively high reflectivity and suitable flexibility (e.g., a certain degree of flexibility).

In at least some exemplary embodiments, a protective sheet 503*a* (e.g., a relatively highly transparent isolation protective sheet) may be provided on the outer side of the optical sensing device. The exemplary disclosed isolation protection sheet (e.g., protective sheet 503*a*) may improve a reliability and service life of sensor component 503 (e.g., optical sensor component). As a physical isolation layer, protective sheet 503*a* may effectively block moisture, lubricants, and/or other substances from entering an area where the optical sensor component is located, substantially preventing these substances from directly contacting and affecting the optical sensor component (e.g., sensor component 503), and substantially avoiding performance degradation and/or damage of sensor component 503 caused by humid environments. Meanwhile, relatively highly transparent performance may be realized by use of the relatively high transparency materials of protective sheet 503*a*, which may have a good impact on monitoring signals, thereby substantially ensuring a normal operation of sensors.

In at least some exemplary embodiments, sexual stimulation device 500 may further include a control module that may be equipped with a control unit, with the control unit being communicatively connected to sensor component 503. The exemplary disclosed control module may include components similar to as described above regarding controller 319, communication device 318, and the exemplary disclosed modules. The control module (e.g., including a control unit) may be configured to determine (e.g., calculate) insertion depth, insertion frequency, and/or insertion time of the exemplary disclosed phallic member (e.g., phallic member 530) in flexible massage portion 502 based on monitoring information of sensor component 503 (e.g., data and/or signals transmitted between the control module and sensor component 503). For example, a control unit of the control module may be configured to determine (e.g., calculate) at least one of an insertion depth, an insertion frequency, or an insertion time of the exemplary disclosed phallic member in the exemplary disclosed flexible massage portion based on monitoring information of the exemplary disclosed sensor component (e.g., sensor component 503). The exemplary disclosed control module may be integrated into sensor component 503 or any other suitable component of sexual stimulation device 500.

In at least some exemplary embodiments and for example as illustrated in FIG. 8B, sexual stimulation device 500 may further include at least a vibration component such as a vibrator 514. Vibrator 514 may be disposed adjacent to and/or attached (e.g., closely attached) to flexible massage portion 502. Vibrator 514 may provide a vibration massage effect to flexible massage portion 502 and massage channel 505. Sexual stimulation device 500 including vibrator 514 may include components similar to male accessory 308. For example, vibrator 514 may include an eccentric rotating mass motor that may include components similar to motor 316 described above.

In at least some exemplary embodiments, sexual stimulation device 500 may include one, two, or more sensor components 503. For example, a first sensor component 503 may be disposed below a bottom of flexible massage portion 502 and two sensor components 503 may be disposed beside flexible massage portion 502.

In at least some exemplary embodiments, sexual stimulation device 500 may provide users with relatively comprehensive and accurate usage data support. Sexual stimulation device 500 may also assist users with understanding their own situation in using the device more scientifically, objectively, and effectively. Sexual stimulation device 500 may further facilitate users' fine control and personalized adjustment of the massage process, foster the development and/or upgrading of personalized product functions based on data analysis, and facilitate users' sharing and interaction based on use of the device.

Sexual stimulation device 500 may include one or more batteries for example as described above regarding motor 316. Sexual stimulation device 500 may include user interface components such as switches, buttons, dials, graphical user interface display components, and/or any other suitable components (e.g., for example as illustrated in FIG. 8A and described above regarding male user device 305). Sexual stimulation device 500 may include connectors such as power connectors and/or communication wires for connecting the exemplary disclosed components (e.g., metal connectors such as copper and/or aluminum wires).

FIGS. 11A, 111B, 12A, 12B, and 13 illustrate a second exemplary embodiment of the exemplary disclosed sexual stimulation device. The exemplary disclosed sexual stimulation device (e.g., a sexual stimulation device 600) may be generally similar to sexual stimulation device 500. For example, sexual stimulation device 600 may include a housing 601 that may be similar to housing 501, a flexible massage portion 602 that may be similar to flexible massage portion 502, a massage channel 605 that may be similar to massage channel 505, a vibrator 614 that may be similar to vibrator 514, and a cover 625 that may be similar to cover 525. Sexual stimulation device 600 may include a cavity 635 (e.g., that may or may not hold the exemplary disclosed fluid described above) formed between housing 601 and flexible massage portion 602, similar to as described above regarding cavity 535.

Figure 12A:
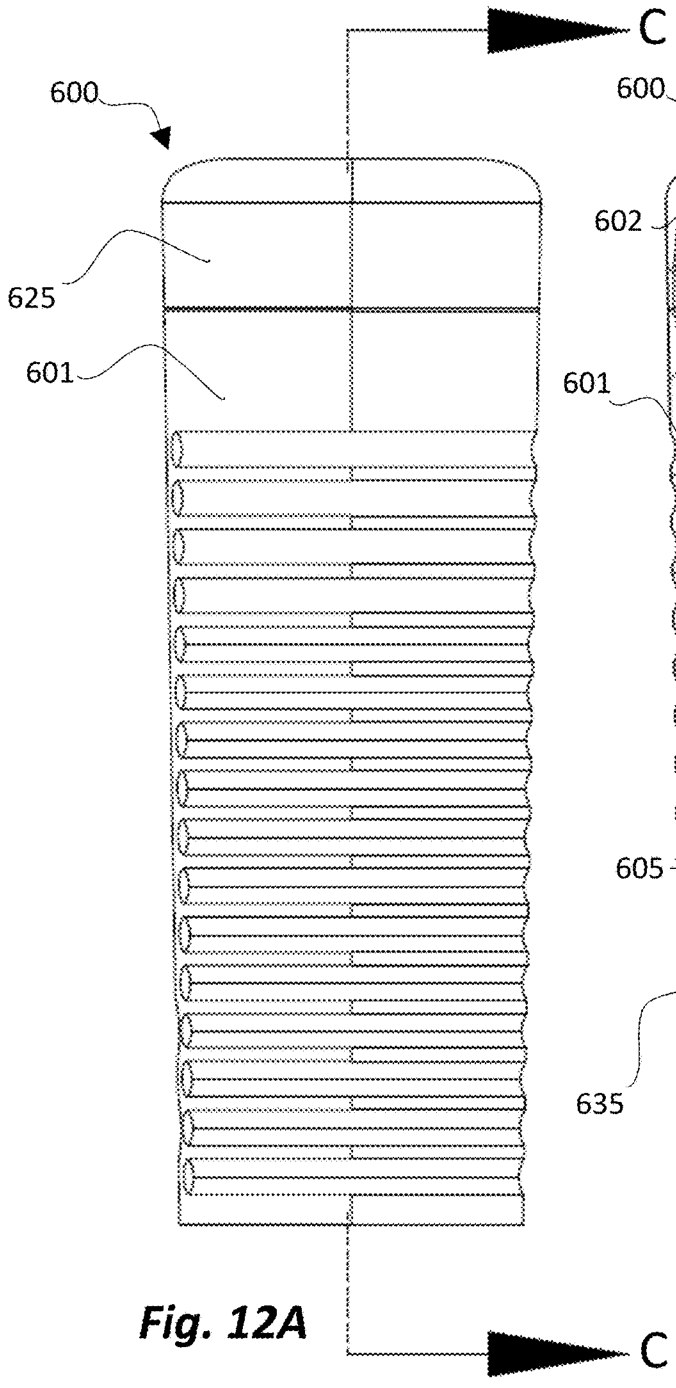
FIG. 12A is a side view of the second exemplary embodiment of the exemplary disclosed apparatus.
Figure 12B:
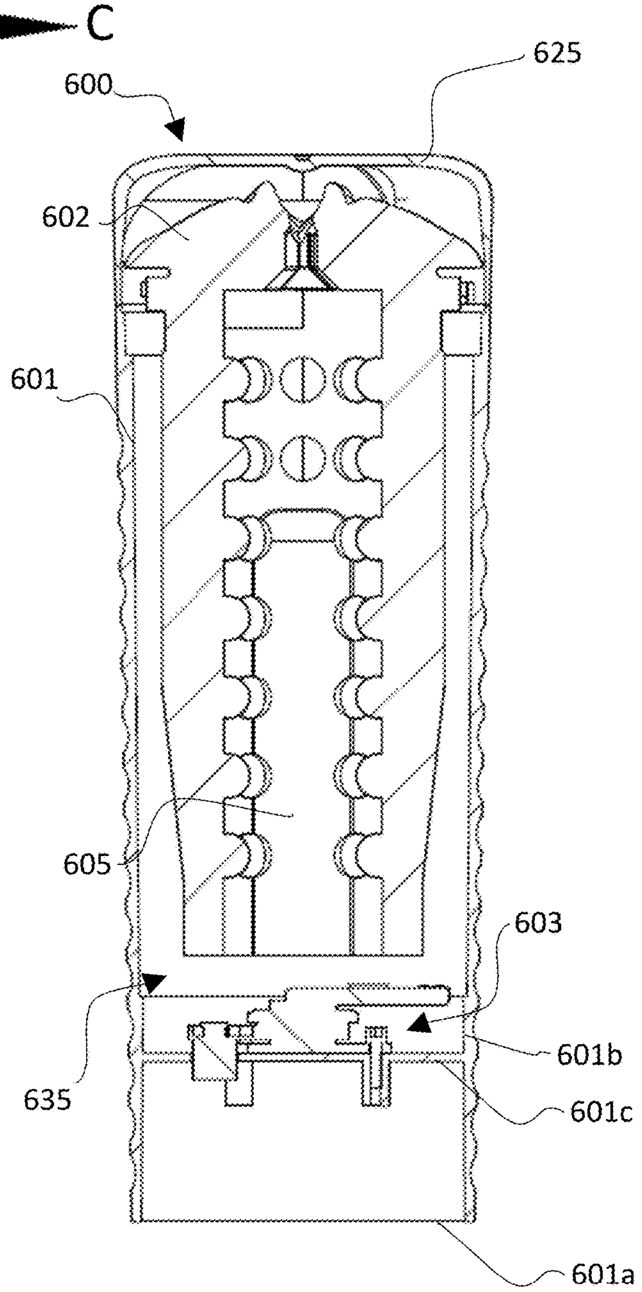
FIG. 12B is a sectional view, taken through section C-C of FIG. 12A, of the second exemplary embodiment of the exemplary disclosed apparatus.
Figure 13:
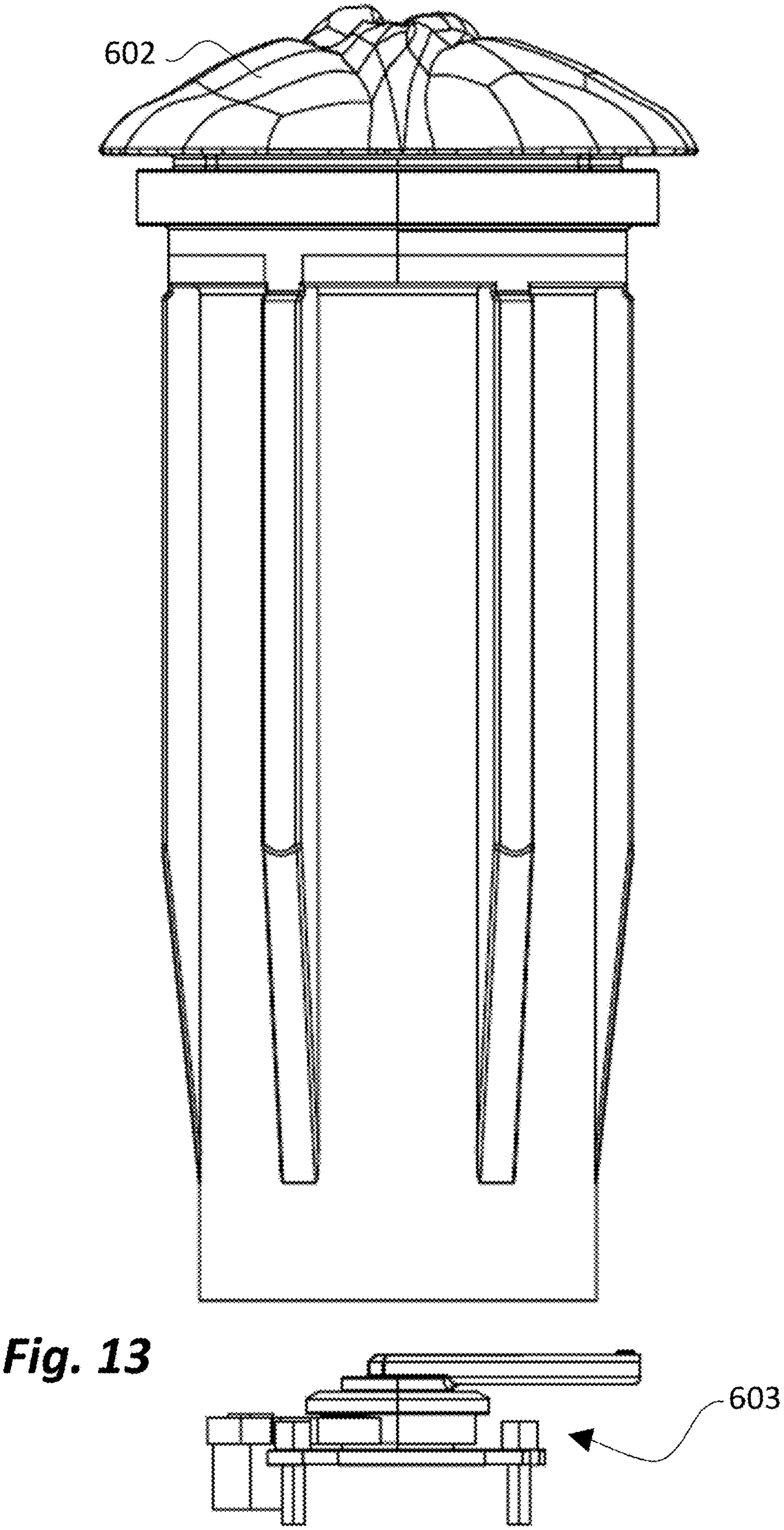
FIG. 13 is a side view of an exemplary disclosed flexible massage portion and an exemplary disclosed sensor component of the second exemplary embodiment of the exemplary disclosed apparatus.
Figure 14A:
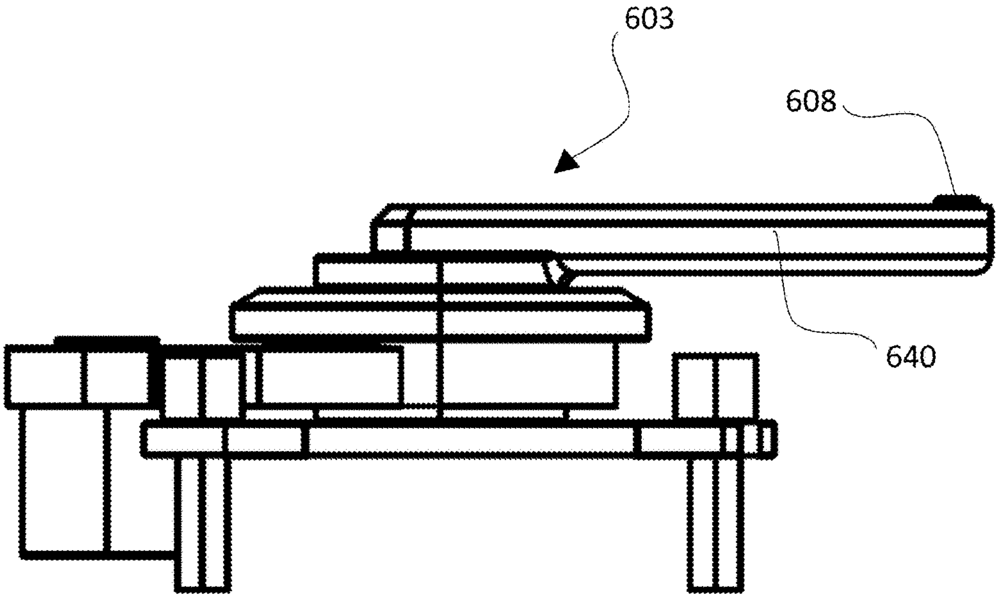
FIG. 14A is a detailed, side view of the exemplary disclosed sensor component of the second exemplary embodiment of the exemplary disclosed apparatus.
Figure 14B:
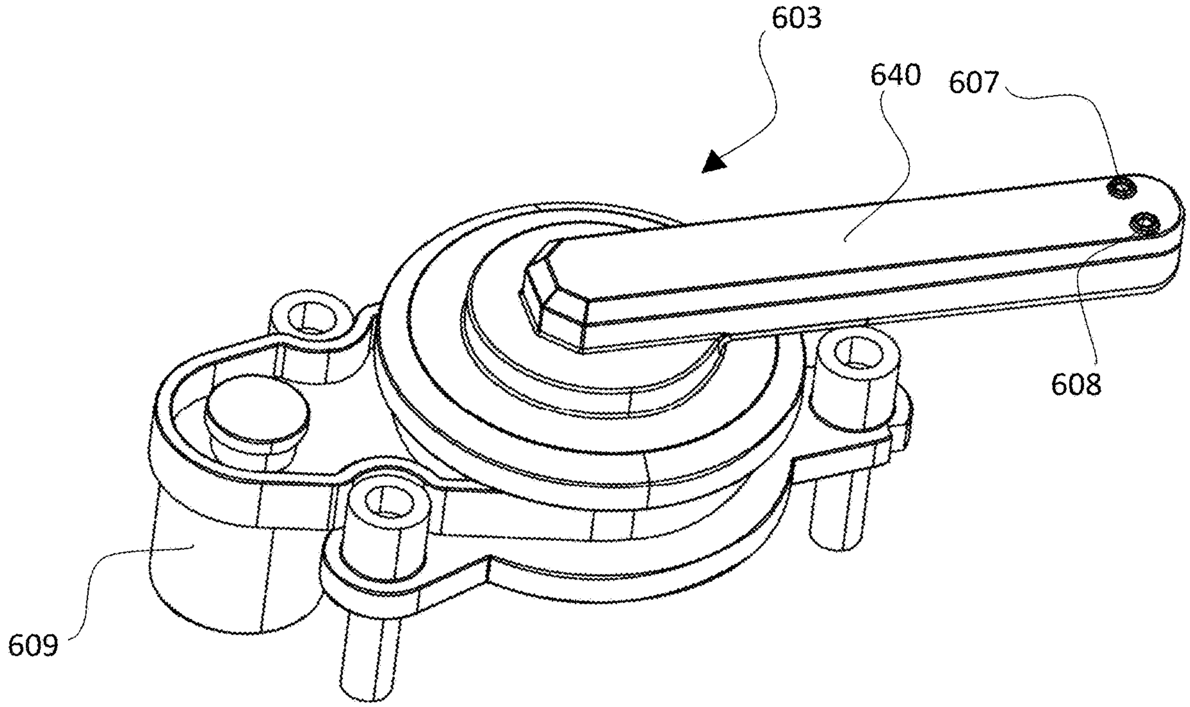
FIG. 14B is a perspective view of the exemplary disclosed sensor component of the second exemplary embodiment of the exemplary disclosed apparatus.

For example as illustrated in FIGS. 14A and 14B, sexual stimulation device 600 may include a sensor component 603 that may have at least some components generally similar to sensor component 503 described above and may operate generally similarly to sensor component 503. Sensor component 603 may include optical elements such as, for example, a laser emitter 607 that may be similar to laser emitter 507, and a laser receiver 608 that may be similar to laser receiver 508. The exemplary disclosed optical element (e.g., including laser emitter 607 and laser receiver 608) may be disposed (e.g. movably or rotatably disposed) at a corner space bounded by flexible massage portion 602, a bottom wall 601*a* of housing 601, and a side wall 601*b* of housing 601 (e.g., bottom wall 601*a* may be disposed at a side of housing 601 away from an opening of housing 601 that may be similar to opening 504) for example as illustrated in FIG. 12B. More specifically for example, the optical element may be disposed at a corner space bounded by flexible massage portion 602, a support plate 601*c*, and side wall 601*b* of housing 601. Support plate 601*c* may be disposed above bottom wall 601*a* and may be configured to support sensor component 503. For example, the exemplary disclosed optical element (e.g., including laser emitter 607 and laser receiver 608) may be disposed at a distal end of an elongated member 640 attached to a rotatable component of sensor component 603 that may be generally similar to rotating disk 512. The exemplary disclosed optical element (e.g., including laser emitter 607 and laser receiver 608) being disposed in this position may facilitate the monitoring of changes at the side and bottom of flexible massage portion 602, making it easier for the exemplary disclosed system to analyze and calculate changes in parameters related to a volume of flexible massage portion 602. In at least some exemplary embodiments, an end of elongated member 640 may extend across cavity 635 (e.g., an end of elongated member 640 may be supported at its central portion and another end extending toward side walls 601*b*) so that laser emitter 607 and laser receiver 608 are disposed at corner spaces of housing 601. When the optical element rotates due to driving of a rotating motor 609, which may be similar to rotating motor 509, the optical element may move along a circular trajectory at the corner spaces and monitor changes in parameters related to a volume of flexible massage portion 602.

Figure 15A:
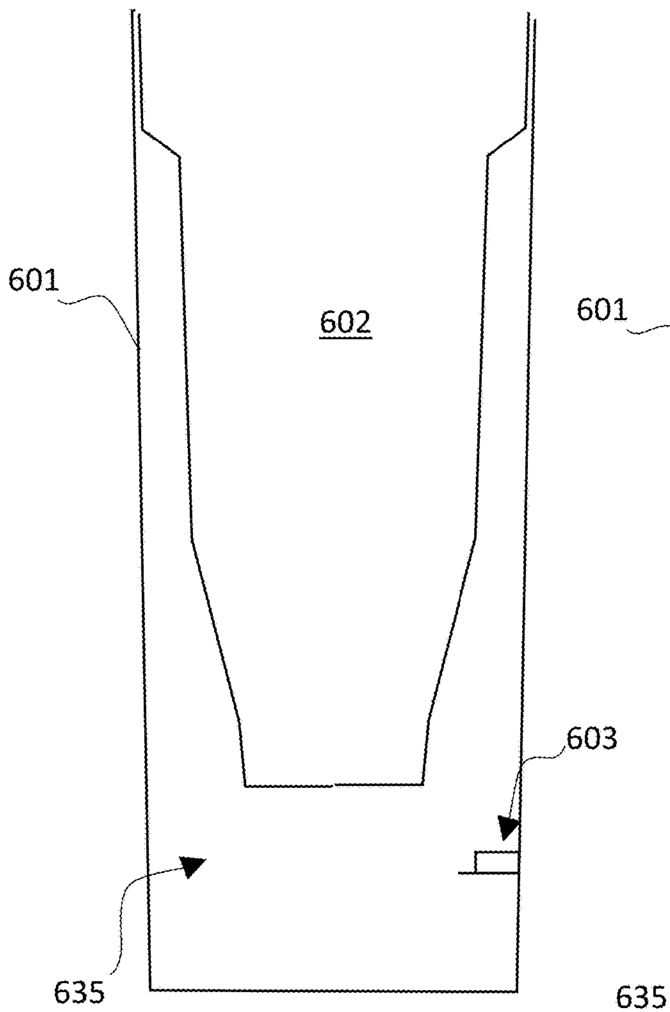
FIGS. 15A and 15B are schematic, sectional views of a component including an exemplary disclosed optical element of the exemplary disclosed apparatus.
Figure 15B:
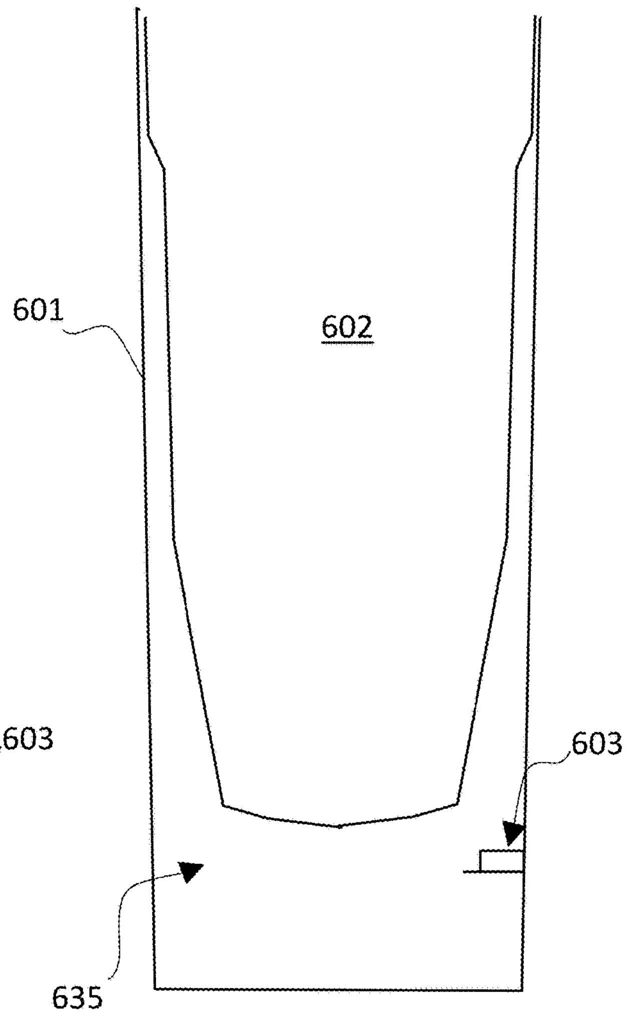

FIGS. 15A and 15B schematically illustrate exemplary disclosed changes in the volume of flexible massage portion 602 (e.g., volume changes in flexible massage portion 502 may be generally similar). FIG. 15A schematically illustrates a volume and shape of flexible massage portion 602 before insertion of the exemplary disclosed phallic member (e.g., phallic member 530) in flexible massage portion 602, and FIG. 15B schematically illustrates the volume and shape of flexible massage portion 602 after insertion of the exemplary disclosed phallic member (e.g., phallic member 530) in flexible massage portion 602. When the exemplary disclosed phallic member is inserted into massage channel 605, flexible massage portion 602 may elongate and/or expand in both axial and radial directions (e.g., decreasing a size or volume of cavity 635) as illustrated in FIG. 15B. At this time, the exemplary disclosed optical element (e.g., including laser emitter 607 and laser receiver 608) may sense data of (e.g., monitor a relatively large amount of distance data associated with) flexible massage portion 602 in different directions. The exemplary disclosed system may thereby monitor changes in parameters related to the volume of the exemplary disclosed flexible massage portion, which may allow the exemplary disclosed system to monitor the movement of the exemplary disclosed phallic member.

In another aspect, the present disclosure may be directed to a sexual stimulation system. The sexual stimulation system may include the exemplary disclosed sexual stimulation device and a remote device configured to communicate the data support with the exemplary disclosed sexual stimulation device. The remote device may include (e.g., but may not be limited to) personal computers, smart phones, laptops, mobile computing devices, tablet PCs, touch boards, and servers.

In a third exemplary embodiment of the exemplary disclosed sexual stimulation device, a female sexual stimulation device (e.g., that may be generally similar to female accessory 315 and in at least some exemplary embodiments may be a configuration of female accessory 315 described above) may be configured to be communicatively connected to (e.g., via the remote device) the exemplary disclosed sexual stimulation device (e.g., sexual stimulation device 500). The exemplary disclosed female sexual stimulation device may include a stimulation portion that may simulate the shape of the exemplary disclosed phallic member (e.g., phallic member 530), and the stimulation portion may be configured to simulate the movement of the exemplary disclosed phallic member based on the exemplary disclosed monitoring information of the exemplary disclosed sensor component of the female sexual stimulation device of the third exemplary embodiment.

For example in the third exemplary embodiment, the exemplary disclosed female sexual stimulation device (e.g., similar to and/or comprising female accessory 315, and/or male accessory 308) and the exemplary disclosed male sexual stimulation device (e.g., sexual stimulation device 500) could form a multiple partner sexual interaction system that may be suitable for remote sexual interaction between partners for example as described herein regarding the exemplary disclosed system (e.g., system 300). The exemplary disclosed stimulation portion (e.g., simulating the form of phallic member 530) may simulate the movement of a penis synchronously or may simulate the movement of the penis with a preset delay threshold. The exemplary disclosed female sexual stimulation device may comprise a second control module (e.g., similar to the exemplary disclosed control module of sexual stimulation device 500 described above) and a driving mechanism (e.g., that may be generally similar to motor 316 and/or other exemplary disclosed driving mechanisms described herein) may communicate with the second control module via the exemplary disclosed communication techniques. For example, the exemplary disclosed female sexual stimulation device may be configured to communicate with the exemplary disclosed sexual stimulation device via a data collection and exchange device (e.g., that may be similar to the exemplary disclosed communication devices for example as described regarding system 300) or via a server (e.g., similar to the exemplary disclosed network). The second control module of the exemplary disclosed female sexual stimulation device may communicate with the exemplary disclosed male sexual stimulation device (e.g., sexual stimulation device 500) via the exemplary disclosed communication techniques, and the driving mechanism of the exemplary disclosed female sexual stimulation device may be connected (e.g., operably connected) to the exemplary disclosed stimulation portion of the exemplary disclosed female sexual stimulation device. Based on information (e.g., data and/or signals) received from the male sexual stimulation device (e.g., sexual stimulation device 500), the second control module of the exemplary disclosed female sexual stimulation device may control a movement of the driving mechanism to drive the movement of the stimulation portion of the exemplary disclosed female sexual stimulation device, which may simulate the real-time movement of the male penis. For example in the third exemplary embodiment, partners in different locations may engage in immersive sexual interaction (e.g., similar to as described above regarding system 300). In at least some exemplary embodiments, the exemplary disclosed female sexual stimulation device may be generally similar to female accessory 315 and/or male accessory 308.

In a fourth exemplary embodiment of the exemplary disclosed sexual stimulation device, a female sexual stimulation device may be configured to be communicatively connected to the exemplary disclosed sexual stimulation device (e.g., sexual stimulation device 500). Similar to the third exemplary embodiment described above, the exemplary disclosed female sexual stimulation device of the fourth exemplary embodiment may be generally similar to female accessory 315 and/or male accessory 308. One or more exemplary disclosed female sexual stimulation devices and one or more male sexual stimulation devices (e.g., one or more sexual stimulation devices 500) may form an interactive online entertainment system, which may suitable for interaction between streamer and viewers (e.g., for example as described above regarding system 300).

The exemplary disclosed interactive online entertainment system of the fourth exemplary embodiment may include at least a first user terminal (e.g., that may be similar to male user device 305), which may be configured to receive information from the exemplary disclosed male sexual stimulation device (e.g., sexual stimulation device 500) and send control instructions to a server processor (e.g., via the exemplary disclosed communication techniques similar for example to the communication techniques described above regarding system 300). The exemplary disclosed interactive online entertainment system of the fourth exemplary embodiment may also include at least a second user terminal (e.g., that may be similar to female user device 310), which may be configured to control movement of the exemplary disclosed female sexual stimulation device (e.g., a structure and function of the female sexual stimulation device may be similar to as described above regarding the third exemplary embodiment, for example generally similar to female accessory 315 and/or male accessory 308). The exemplary disclosed interactive online entertainment system of the fourth exemplary embodiment may further include a server processor (e.g., that may be similar to the exemplary disclosed controller and/or control module for example of the first exemplary embodiment), which may be communicatively connected to the first user terminal and the second user terminal via the exemplary disclosed communication techniques. The male sexual stimulation device (e.g., sexual stimulation device 500) may be communicatively connected to the first user terminal, and may be configured to monitor movement information of the exemplary disclosed phallic member of a first user (e.g., penis of a male user) in the exemplary disclosed flexible massage portion (e.g., flexible massage portion 502) in real-time (e.g., in real-time or near real-time) and send monitor information (e.g., data and/or signals of sensor component 503) to the first user terminal. The exemplary disclosed female sexual stimulation device may be communicatively connected to the second user terminal via the exemplary disclosed communication techniques and may receive control instruction from the second user terminal. The exemplary disclosed server processor may be configured to receive control instructions from the first user terminal and send the control instructions to the second user terminal, and then control movement of the exemplary disclosed female sexual stimulation device. The exemplary disclosed female sexual stimulation device may include a stimulation portion (e.g., similar to as described above regarding the third exemplary embodiment) that may simulate a shape of the exemplary disclosed phallic member. The exemplary disclosed stimulation portion may be configured to simulate a movement of the exemplary disclosed phallic member based on the monitoring information of the sensor component (e.g., that may be similar to sensor component 503) of the female sexual stimulation device. The exemplary disclosed stimulation portion may simulate a movement of the exemplary disclosed phallic member (e.g., a user penis) synchronously or may simulate the movement of the penis with a preset delay threshold (e.g., time period delay).

In at least some exemplary embodiments of the exemplary disclosed interactive online entertainment system of the fourth exemplary embodiment, different viewers (e.g., male user viewers for example as described above regarding system 300) may use different male sexual stimulation devices (e.g., sexual stimulation devices 500) and a streamer (e.g., a female user such as a model for example as described above regarding system 300) may use the exemplary disclosed female sexual stimulation device. A selected male user (e.g., a male user 320 via a streaming game selection and/or based on a tip amount provided to the streamer) may obtain (e.g., achieve) online interactive connection with the streamer (e.g., model such as female user 325), and the selected male user may control the streamer's female sexual stimulation (e.g., provided by the exemplary disclosed female sexual stimulation device through use of his male sexual stimulation (e.g., provided via sexual stimulation device 500), thereby achieving an immersive remote interaction that may be watched by many viewers (e.g., via the exemplary disclosed chat or streaming room described above regarding system 300), thereby gaining satisfaction (e.g., a sense or profound sense of excitement, prestige, honor, and/or satisfaction, for example among a community of users).

Figure 16:
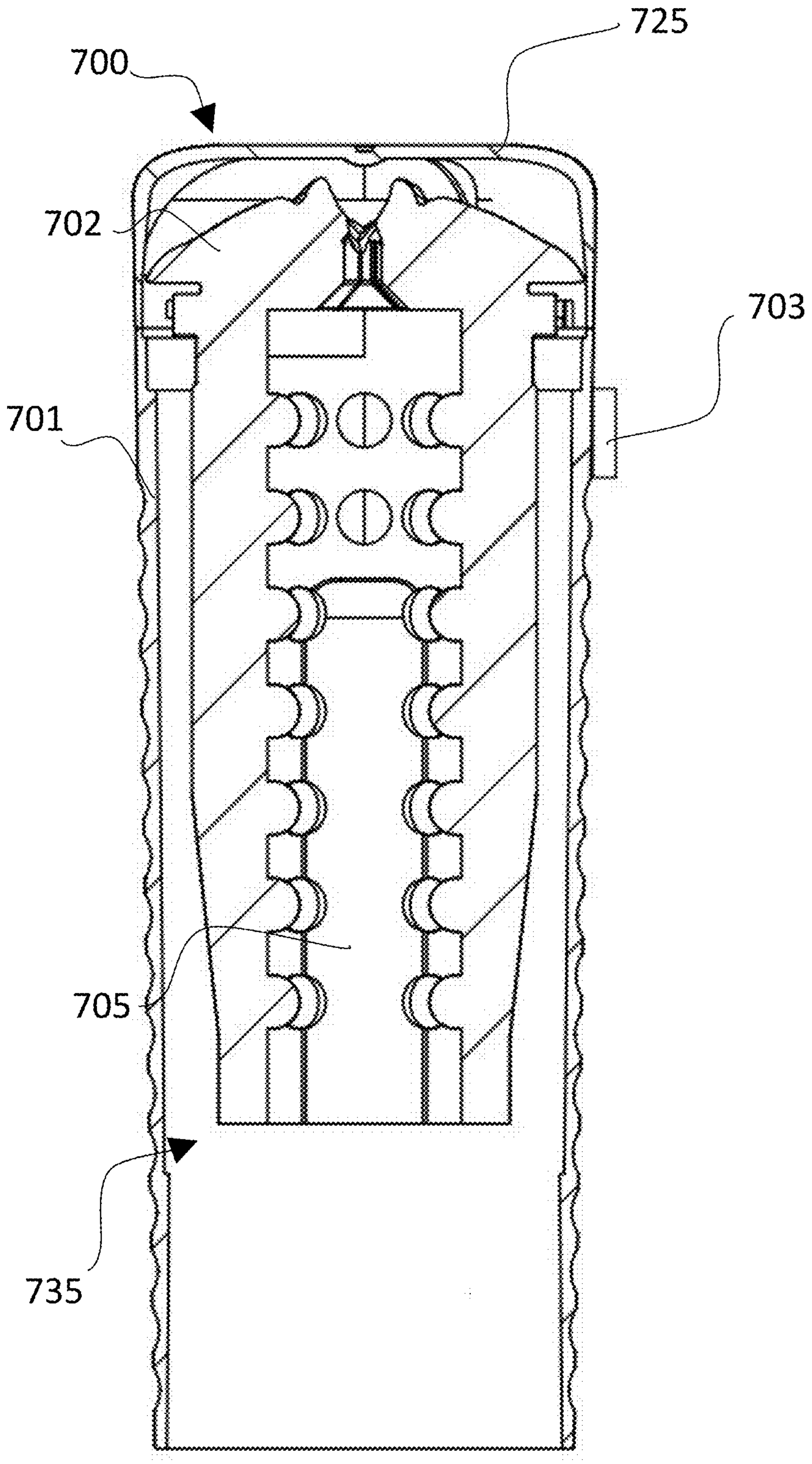
FIG. 16 is a sectional view of a fifth exemplary embodiment of the exemplary disclosed apparatus.

FIG. 16 illustrates a fifth exemplary embodiment of the exemplary disclosed sexual stimulation device. The exemplary disclosed sexual stimulation device (e.g., a sexual stimulation device 700) may be generally similar to sexual stimulation device 500. For example, sexual stimulation device 700 may include a housing 701 that may be similar to housing 501, a flexible massage portion 702 that may be similar to flexible massage portion 502, a massage channel 705 that may be similar to massage channel 505, a vibrator that may be similar to vibrator 514, and a cover 725 that may be similar to cover 525. Sexual stimulation device 700 may include a cavity 735 (e.g., that may or may not hold the exemplary disclosed fluid described above) formed between housing 701 and flexible massage portion 702, similarly to as described above regarding cavity 535.

For example as illustrated in FIG. 16, sexual stimulation device 700 may include a sensor component 703 that may have at least some components generally similar to sensor component 503 described above (e.g., including a laser emitter and a laser receiver) and may operate generally similarly to sensor component 503. Sensor component 703 may be disposed on a surface (e.g., an exterior surface) of housing 701 and may be configured to monitor a relative position between a user (e.g., a penis of the user) of sexual stimulation device 700 and sensor component 703, thereby monitoring movement of the exemplary disclosed phallic member (e.g., phallic member 530 that may be a penis of the user). For example, sensor component 703 may be disposed in relative close proximity to an opening (e.g., that may be similar to opening 504) of housing 701. Sensor component 703 may be oriented toward a user.

For example in at least some exemplary embodiments of the fifth exemplary embodiment, sensor component 703 may be an optical sensor component. For example, sensor component 703 may be a laser sensor including a laser emitter that may be similar to laser emitter 507 and a laser receiver that may be similar to laser receiver 508. In at least some exemplary embodiments, the exemplary disclosed laser sensor may be a rotary laser sensor that may be generally similar to the exemplary disclosed rotary laser sensor described above regarding sensor component 503.

For example in at least some exemplary embodiments of the fifth exemplary embodiment, sensor component 703 may be a laser sensor that may have a fixed structure that may use triangulation for distance measurement (e.g., to measure a distance between sensor component 703 and the exemplary disclosed phallic member such as a penis of the user). Sensor component 703 may be for example a point sensor or a line sensor type of laser triangulation sensor.

Figure 21:
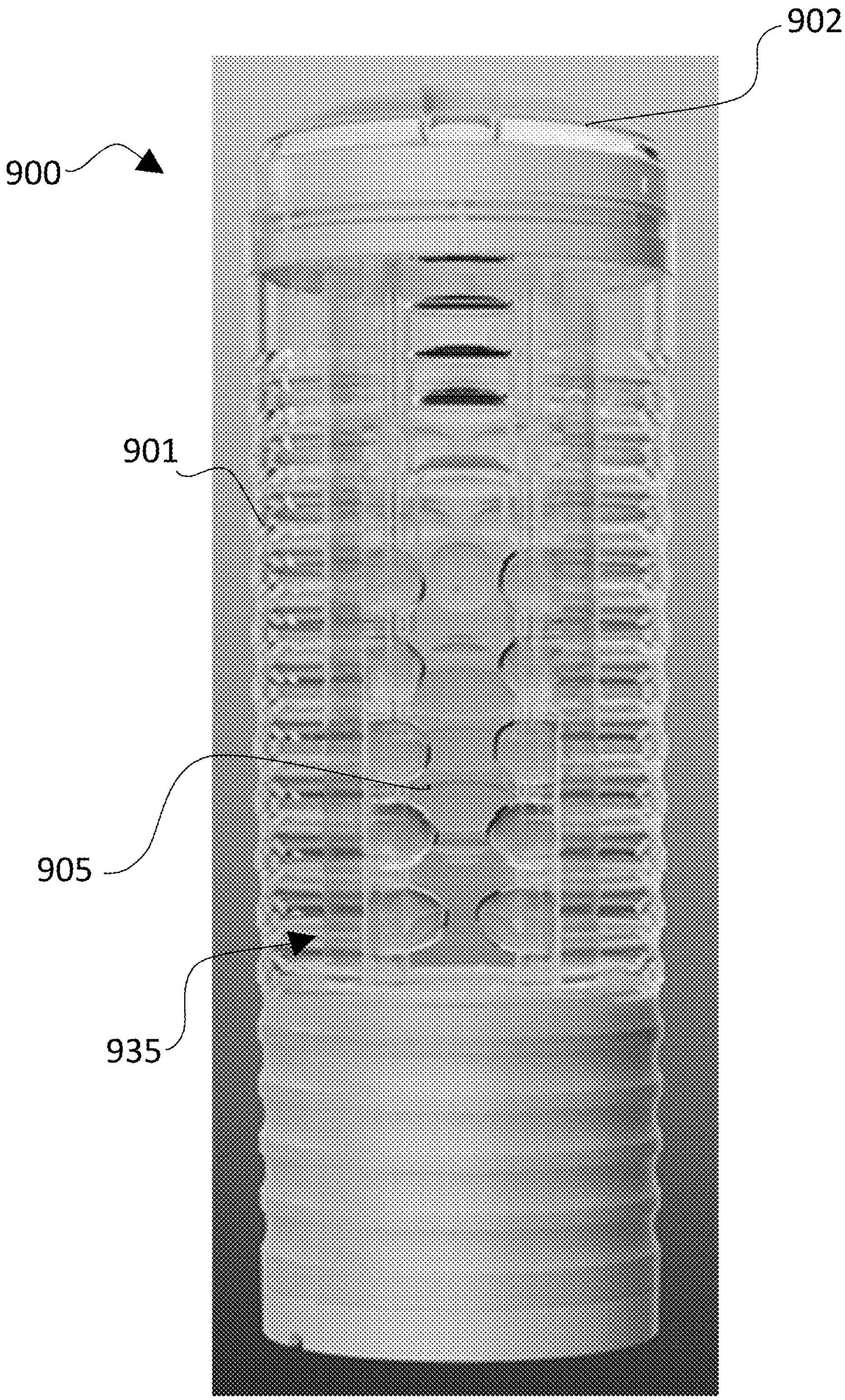
FIG. 21 is a side view of a sixth exemplary embodiment of the exemplary disclosed apparatus when a cover is moved (e.g., removed)
Figure 22:
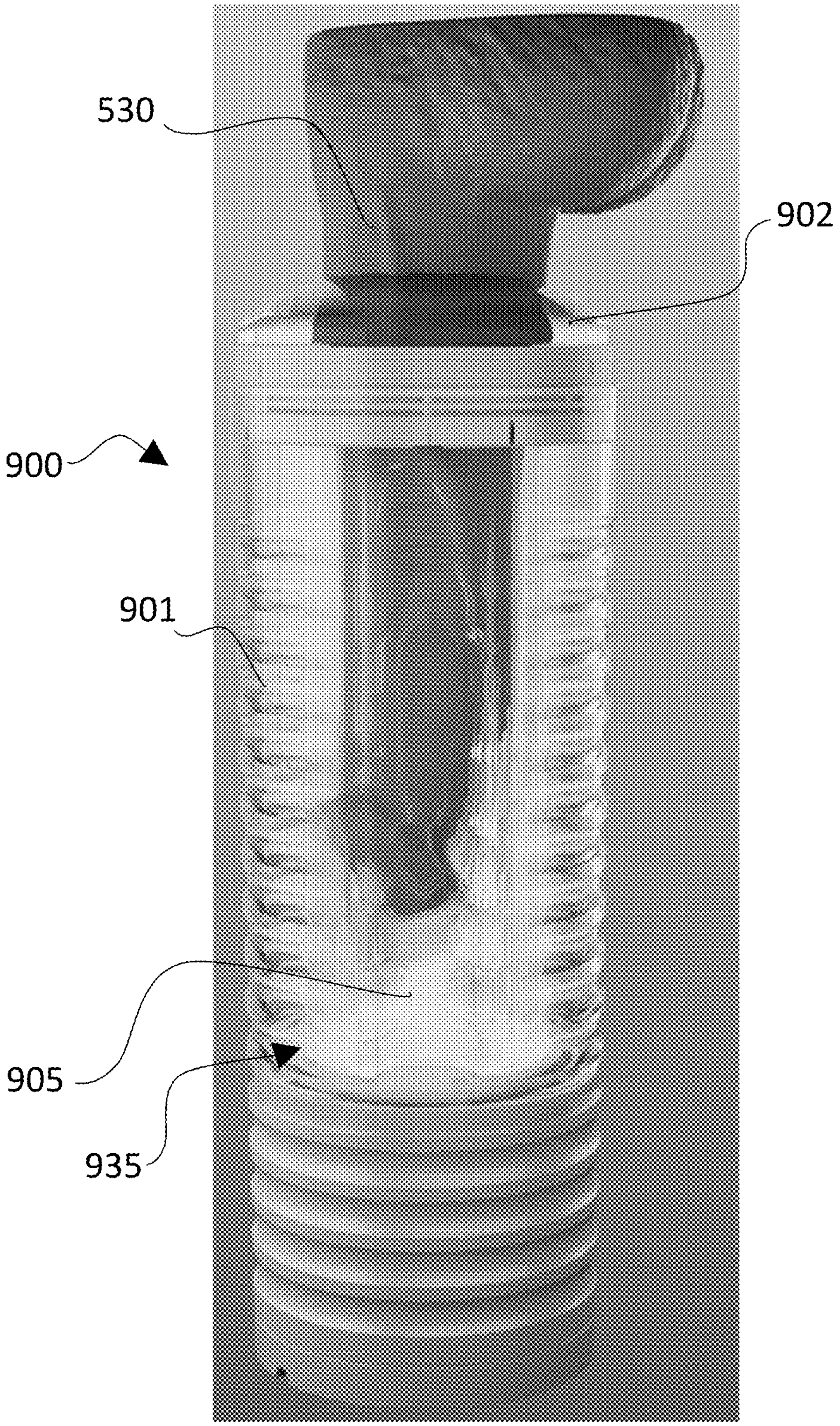
FIG. 22 is a side view of the sixth exemplary embodiment of the exemplary disclosed apparatus when a cover is moved (e.g., removed) and a phallic member is inserted.

FIG. 21 (illustrating non-working state) and FIG. 22 (illustrating working state) illustrates a sixth exemplary embodiment of the exemplary disclosed sexual stimulation device. A sexual stimulation device 900 may include a housing 901, a flexible massage portion 902, a massage channel 905 that may be similar to massage channel 505, a vibrator that may be similar to vibrator 514, and a cover that may be similar to cover 525. Sexual stimulation device 900 may include a cavity 935 formed between housing 901 and flexible massage portion 902, similarly to as described above regarding cavity 535.

Further, at least a part of housing 901 may be transparent so that an interior (e.g., an inside) of housing 901 may be seen from outside of housing 901. Furthermore, at least a part of flexible massage portion 902 may be transparent to allow for a more intuitive and clear observation of the movement of the phallic member inside the housing (e.g., within flexible massage portion 902), such as an insertion depth, an insertion frequency, and/or an insertion time. Specifically for example, sexual stimulation device 900 may be suitable for application in the field of interactive online entertainment system (e.g., live broadcasting). For example because a viewer may see the inside of housing 901, such visibility may improve (e.g., may greatly improve) the viewing experience of the user and satisfy the user's desire for control, thereby enhancing an interaction between the viewers and a streamer.

Figure 23A:
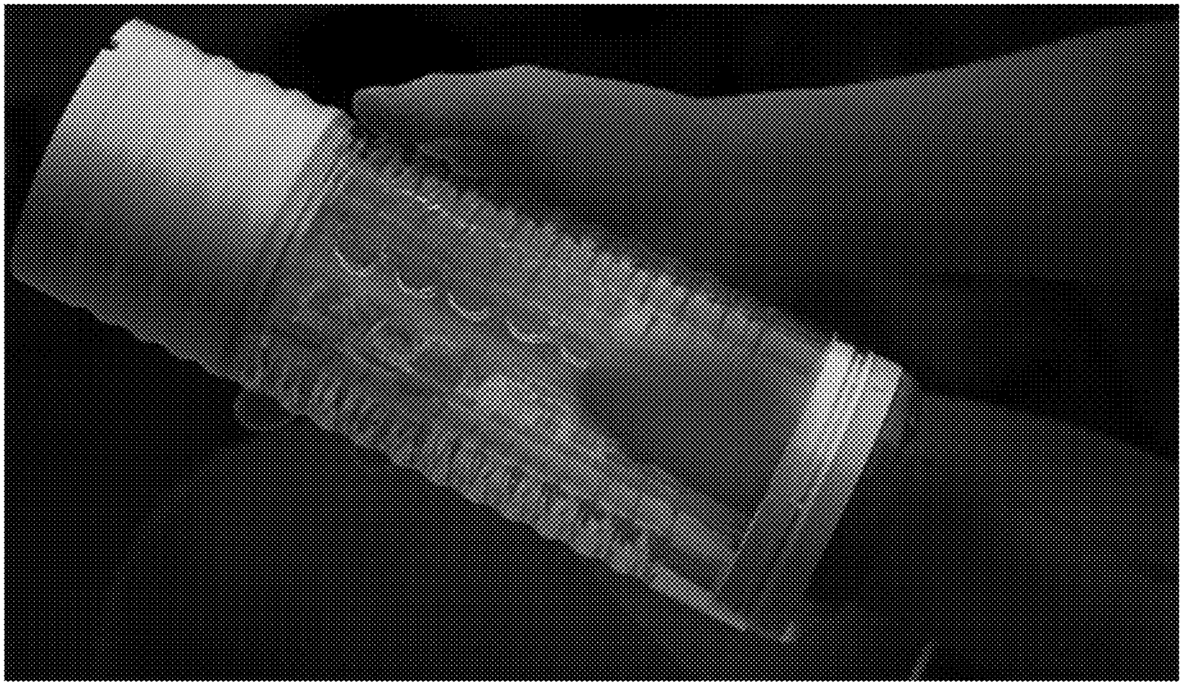
FIGS. 23A and 23B are schematic diagrams of the sixth exemplary embodiment of the exemplary disclosed apparatus with two types of insertion depths.
Figure 23B:
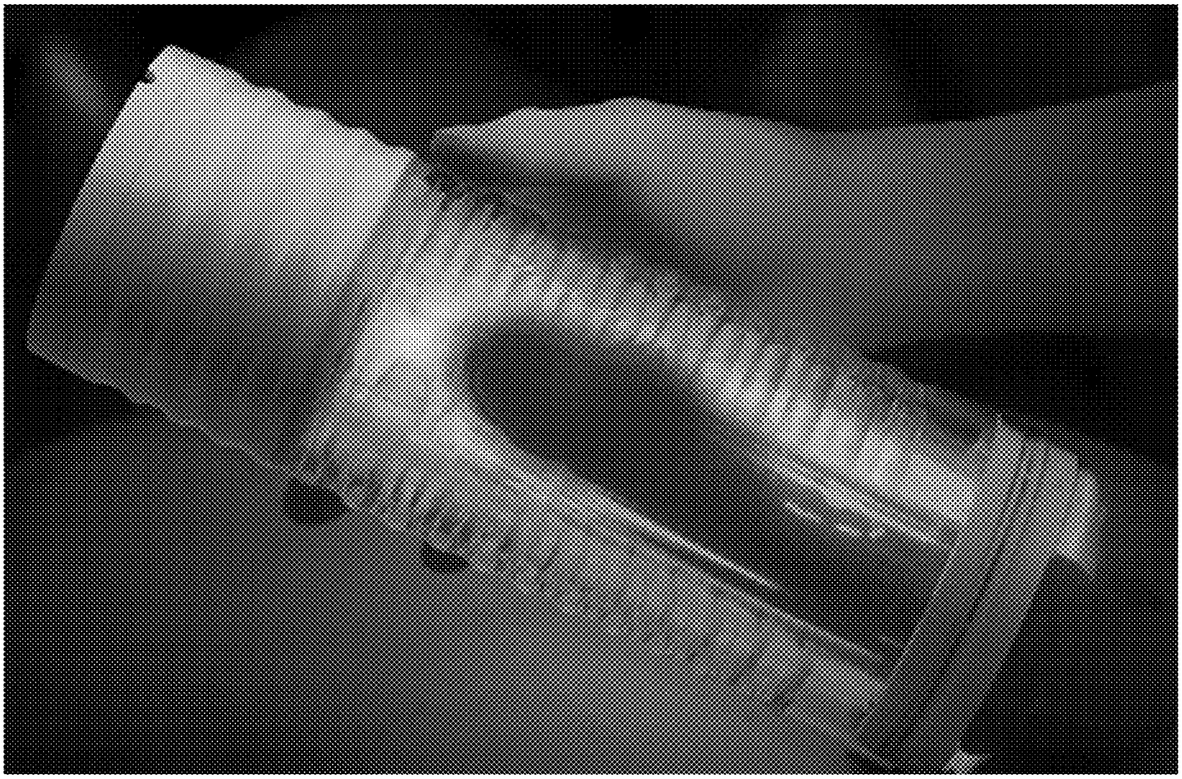

In at least some exemplary embodiments of the exemplary disclosed sexual stimulation device, a light source may also be installed inside sexual stimulation device 900, such as one or more lights with different types of lighting effects. Changes in lighting effects may be matched with the movement of the phallic member (e.g., phallic member 530). In at least some exemplary embodiments, the degree of brightness of the light source may correspond to the insertion depth of the phallic member, or the flashing frequency of the light may correspond to the insertion frequency of the phallic member, or the degree of brightness may correspond to the combination of the insertion depth and insertion frequency of the phallic member. As shown for example in FIGS. 23A and 23B, the light source may emit any suitable color of light (e.g., red light), lower degrees of brightness of the light (e.g., light red) may correspond to shallower insertion depths and/or slower insertion speeds, as is shown in FIG. 23*a*, while higher degrees of brightness (e.g. dark red) of the light may correspond to deeper insertion depths and/or faster insertion speeds, as is shown in FIG. 23B. In at least some exemplary embodiments, different types of light colors may also correspond to different movements of the phallic member, and may be designed according to user desires (e.g., preferences). The surface of the exemplary disclosed flexible massage portion may be coated with a fluorescent layer, so that the flexible massage portion may exhibit a luminous effect when the light source is operating, due to the fluorescent layer's absorption of light from the light source. The configuration of the light source may thereby further enhance the viewer's visual experience. Sexual stimulation device 900 may also be used as a lighting device. When not used for sexual stimulation function, sexual stimulation device 900 may also be a decoration (e.g., an exquisite decoration), which may provide customized lighting, and/or may work as a night light or ambient light. The exemplary disclosed changes in operation of the light source may be further related to the viewer's tipping behavior. For example, when receiving a tip, the light may flash once (e.g., or any desired number of times). The more tips that may be received, then the brighter the light source may glow. The exemplary disclosed light source may be integrated into and/or attached to any suitable component of sexual stimulation device 900 such as, for example, flexible massage portion 902 and/or housing 901.

In at least some exemplary embodiments of the exemplary disclosed sexual stimulation device, volume changes of the sexual stimulation device or of one or more its components may be related to the tipping activities of the viewers. For example, the more tips that may be received, then the larger the volume of the sexual stimulation device may be or the smaller the volume of the flexible massage portion may be. Volume adjustments of the flexible massage portion may be regulated by controlling air pressure or liquid pressure between the flexible massage portion and the housing, or by controlling pressure within an air bag or a liquid bag which is disposed between the flexible massage portion and the housing.

In at least some exemplary embodiments of the exemplary disclosed sexual stimulation device, the sexual stimulation device may include one or more spray components that may be related to the tipping activities of the viewers. The more tips that may be received, the greater the spray output, whether in terms of the amount of substance sprayed, the spraying height, or the spraying distance (e.g., for a stronger celebratory effect and a greater visual impact). Spray substance may include liquid, smoke, and/or colored materials (such as ribbons, colored particles).

In at least some exemplary embodiments of the exemplary disclosed sexual stimulation device, the sexual stimulation device may include (e.g., be equipped with) sound components, such as speakers configured to play different music. Changes in music may correspond to (e.g., be matched with) the movement of the phallic member. In at least some exemplary embodiments, the speed and/or volume of music rhythm may correspond to the insertion depth and/or insertion frequency of the phallic member. The exemplary disclosed sound component may further enhance the viewer's auditory experience. The exemplary disclosed sound components may be integrated into and/or attached to any suitable component of sexual stimulation device 900 such as, for example, flexible massage portion 902 and/or housing 901. The exemplary disclosed sexual stimulation device may also include (e.g., be equipped with) both the exemplary disclosed one or more light sources and sound components simultaneously.

In at least some exemplary embodiments, sexual stimulation device 900 may include a sensor component that may be similar to sensor component 503, 603, or 703. The exemplary disclosed sensor component of this exemplary embodiment may be configured to monitor changes in parameters related to a volume of flexible massage portion 902 caused by the movement of the exemplary disclosed phallic member in massage channel 905, thereby providing data support for monitoring the movement of the exemplary disclosed phallic member (e.g., allowing for direct control of the light source and/or sound component).

The exemplary disclosed system, apparatus, and method may be used in any suitable application for providing sexual stimulation. The exemplary disclosed system, apparatus, and method may be used in any suitable application for providing an adult toy. For example, the exemplary disclosed system, apparatus, and method may be used in any suitable application for providing a sexual massager for stimulating a user's penis.

Figure 17:
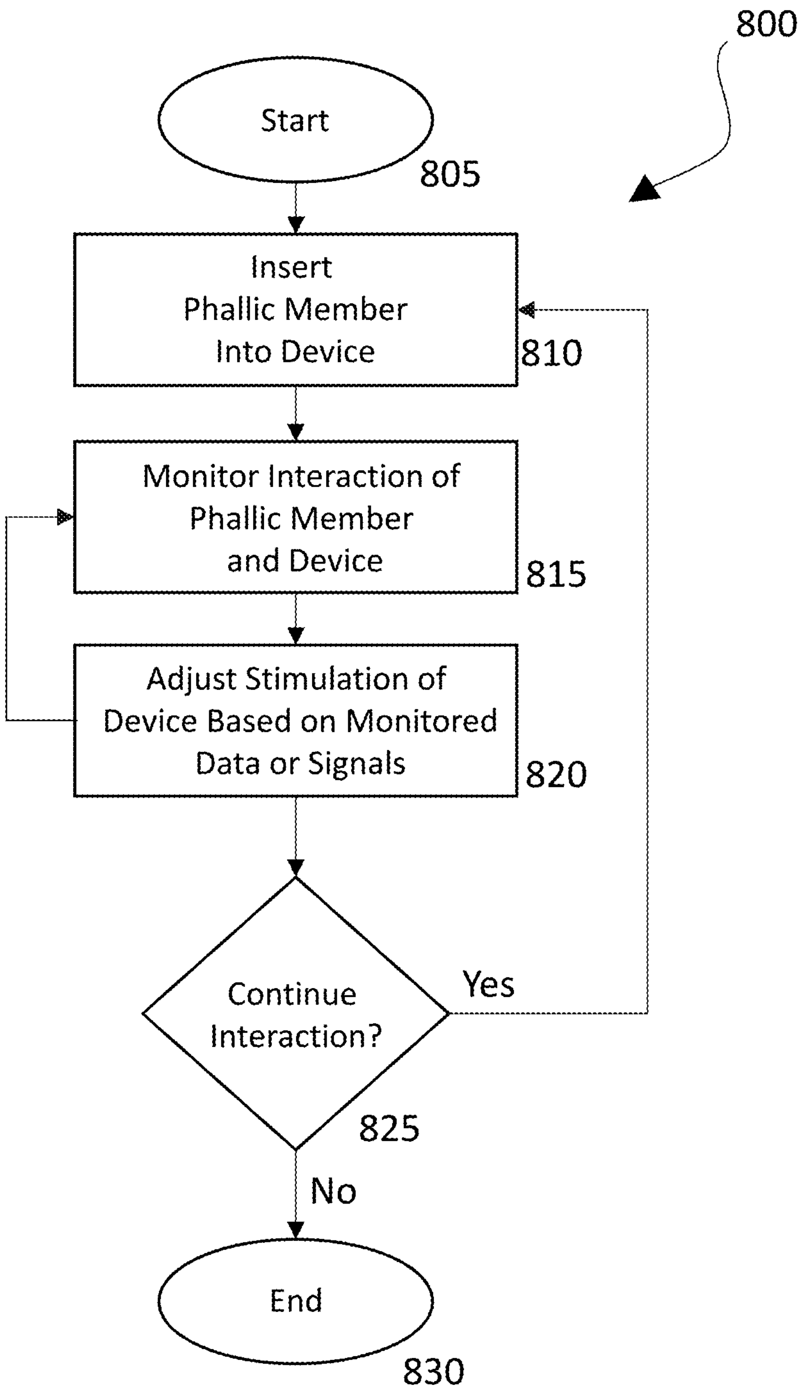
FIG. 17 is a flowchart showing an exemplary process of the present invention.

FIG. 17 illustrates an exemplary process for an operation of the exemplary disclosed system. Process 800 begins at step 805. At step 810, the exemplary disclosed phallic member (e.g., phallic member 530) may be inserted into the exemplary disclosed sexual stimulation device. For example, phallic member 530 may be inserted into massage channel 505 of flexible massage portion 502 via insertion opening 506. Insertion may also be performed similarly using the other exemplary disclosed sexual stimulation devices of the other exemplary embodiments described herein. The exemplary disclosed phallic member may be moved back and forth (e.g., iteratively inserted deeper and then retracted and then inserted deeper again repeatedly as desired) as the exemplary disclosed sexual stimulation device is utilized.

At step 815, the exemplary disclosed sensor components may perform sensing as described above regarding the first, second, third, fourth, and/or fifth exemplary embodiments. Also for example, the exemplary disclosed sensor components may operate for example as described above to monitor the interaction of the exemplary disclosed phallic member and the exemplary disclosed sexual stimulation device (e.g., interaction with the exemplary disclosed flexible massage portion). The exemplary disclosed control module (e.g., control unit or controller) may communicate with the exemplary disclosed one or more sensor components via the exemplary disclosed communication techniques, including for example transmitting data and/or signals associated with the exemplary disclosed volume changes of the exemplary disclosed flexible massage portion to the exemplary disclosed control module (e.g., control unit or controller).

At step 820, the exemplary disclosed control module (e.g., controller) may control an adjustment of the exemplary disclosed sexual stimulation device based on the data and/or signals collected and transmitted by the exemplary disclosed one or more sensor components to the exemplary disclosed control module (e.g., control unit or controller). For example, the exemplary disclosed control module (e.g., control unit or controller) may control an adjustment of sexual stimulation provided by the exemplary disclosed sexual stimulation device. For example, the exemplary disclosed control module (e.g., control unit or controller) may control (e.g., adjust) an operation of the exemplary disclosed vibrator (e.g., and/or any other suitable component of the exemplary disclosed sexual stimulation device) based on the data and/or signals collected and transmitted by the exemplary disclosed one or more sensor components to the exemplary disclosed control module (e.g., controller). The exemplary disclosed system may perform as many iterations as desired (e.g., based on user actions and/or input) of steps 815 and 820.

At step 825, the exemplary disclosed system may determine whether or not interaction of the exemplary disclosed phallic member and the exemplary disclosed sexual stimulation device is to be continued (e.g., based on user actions and/or input, a predetermined time period elapsing, viewer input, machine learning operations, and/or any other suitable criteria). If the interaction is to be continued, process 500 may return to step 810. As many iterations as desired of steps 810 through 825 may be performed. If the interaction is not to be continued, process 800 ends at step 830.

The invention includes other illustrative embodiments ("Embodiments") as follows.

Embodiment 1: A sexual stimulation device, comprising: a housing, at least one end portion of which includes an opening; a flexible massage portion, which is at least partially disposed in the housing, and includes a massage channel that is configured to accommodate a phallic member and an insertion opening configured to allow the phallic member to enter and exit the massage channel; and a sensor component, which is disposed within the housing, and is configured to monitor changes in parameters related to a volume of the flexible massage portion caused by a movement of the phallic member in the massage channel, thereby providing data support for monitoring the movement of the phallic member.

Embodiment 2: The sexual stimulation device of Embodiment 1, wherein the changes in parameters related to the volume of the flexible massage portion are changes in a relative volume formed between the flexible massage portion and the housing based on morphological transformation of the flexible massage portion itself.

Embodiment 3: The sexual stimulation device of Embodiment 1, wherein the changes in parameters related to the volume of the flexible massage portion are changes in the volume of the flexible massage portion itself based on morphological transformation of the flexible massage portion.

Embodiment 4: The sexual stimulation device of Embodiment 1, wherein the changes in parameters related to the volume of the flexible massage portion are changes in a relative volume formed between the flexible massage portion and the phallic member.

Embodiment 5: The sexual stimulation device of Embodiment 1, wherein the sensor component is an optical sensor component.

Embodiment 6: The sexual stimulation device of Embodiment 5, wherein the sensor component is a rotatable optical sensor component.

Embodiment 7: The sexual stimulation device of Embodiment 6, wherein: the sensor component includes at least one of an optical element and a rotating structure configured to rotatably drive the optical element; and the optical element is a laser sensor or an infrared sensor.

Embodiment 8: The sexual stimulation device of Embodiment 5, wherein the optical sensor component includes a laser emitter and a laser receiver.

Embodiment 9: The sexual stimulation device of Embodiment 5, wherein a scanning range of the optical sensor component is less than a preset threshold, so that the scanning range of the optical sensor component only covers the flexible massage portion.

Embodiment 10: The sexual stimulation device according to claim 5, wherein: a blocking element is disposed at a peripheral side of the optical sensor component; the blocking element is configured to limit a range of beam emission angles of the optical sensor component; and a light absorbing layer is provided on the blocking element.

Embodiment 11: The sexual stimulation device of Embodiment 1, wherein the sensor component is disposed between the housing and the flexible massage portion.

Embodiment 12: The sexual stimulation device of Embodiment 11, wherein an optical element of the sensor component is disposed at a corner space bounded by the flexible massage portion, a bottom wall of the housing, and a side wall of the housing, wherein the bottom wall is located at a side of the housing disposed away from the opening of the housing.

Embodiment 13: The sexual stimulation device of Embodiment 1, further comprising a control module equipped with a control unit, wherein: the control unit is communicatively connected to the sensor component; and the control unit is configured to calculate at least one of an insertion depth, an insertion frequency, or an insertion time of the phallic member in the flexible massage portion based on monitoring information of the sensor component.

Embodiment 14: The sexual stimulation device of Embodiment 1, further comprising a vibration component disposed adjacent to or attached to the flexible massage portion.

Embodiment 15: A monitoring method, comprising: monitoring a sexual stimulation device that includes a massage portion configured to apply sexual stimulation to at least a genital portion of a user; and a sensor component, which is configured to monitor changes in parameters related to the massage portion caused by a relative movement of the massage portion and the genital portion, thereby providing data support for monitoring the relative movement of the massage portion and the genital portion; wherein, monitoring the changes in parameters related to the massage portion includes performing static data acquisition by obtaining static three-dimensional data related to the massage portion in a non-working state using the sensor component; performing target data acquisition by obtaining real-time three-dimensional data related to the massage portion in a working state using the sensor component, and comparing the real-time three-dimensional data with the static three-dimensional data to determine a target three-dimensional data that has undergone changes; and performing analysis based on the target three-dimensional data, including analyzing and obtaining a motion trajectory of the massage portion.

Embodiment 16: The monitoring method of Embodiment 15, wherein the static three-dimensional data and the real-time three-dimensional data are multi-frame point clouds.

Embodiment 17: The monitoring method of Embodiment 15, wherein performing the target data acquisition includes: obtaining the real-time three-dimensional data related to the massage portion in the working state using the sensor component when the genital portion and the massage portion are moving relative to each other; comparing each frame point cloud of the real-time three-dimensional data with the static three-dimensional data; and eliminating point clouds that overlap with point clouds of the static three-dimensional data, wherein the remaining point clouds are retained as the target three-dimensional data.

Embodiment 18: The monitoring method of Embodiment 17, wherein performing the analysis includes: performing a clustering algorithm on the remaining points of the remaining point clouds, and dividing the remaining points into multiple independent target groups; and analyzing the motion trajectory of the multiple independent target groups to obtain the motion trajectory of the flexible massage portion.

Embodiment 19: A sexual stimulation system, comprising: a sexual stimulation device, including a housing, at least one end portion of which includes an opening; a flexible massage portion, which is at least partially disposed in the housing, and includes a massage channel that is configured to accommodate a phallic member and an insertion opening configured to allow the phallic member to enter and exit the massage channel; and a sensor component, which is disposed within the housing, and is configured to monitor changes in parameters related to a volume of the flexible massage portion caused by a movement of the phallic member in the massage channel, thereby providing data support for monitoring the movement of the phallic member; and a remote device configured to communicate the data support with the sexual stimulation device.

Embodiment 20: The sexual stimulation system of Embodiment 19, wherein the sexual stimulation system includes a female sexual stimulation device configured to communicate with the sexual stimulation device via the remote device.

The exemplary disclosed system, apparatus, and method may provide an efficient and effective technique for providing sufficient quantitative collection of data during the use of adult toys such as a sexual massager. For example, the exemplary disclosed system, apparatus, and method may provide an efficient and effective technique for providing sufficient quantitative collection of data related to movement of a user's penis or other phallic member relative to a sexual massager. For example, the exemplary disclosed system, apparatus, and method may provide an efficient and effective technique for substantially accurately measuring information such as an insertion depth or a thrusting frequency of a user's penis or other phallic member inside of a sexual massager. The exemplary disclosed system, apparatus, and method may thereby facilitate substantially precise control, adjustment, and personalization of a sexual massager by a user.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

The exemplary disclosed system may include an agentic AI system. The agentic AI system may include sensors for example as described herein (e.g., cameras, microphones, and other exemplary disclosed sensors of male accessory 308, female accessory 315, male user device 305 and/or female user device 310, including for example respective sensor array 306, imaging device 350, and/or any other suitable devices described herein). The agentic AI system may also include input channels for processing raw data obtained by system 300 and a data preprocessing module for preparing data for use by the exemplary disclosed engines. The agentic AI system may utilize algorithms for analyzing the obtained data for example as described herein. The agentic AI system may operate (e.g., using reinforcement learning or rule-based planning) to create a series of activities or actions for achieving a desired result. The agentic AI system may then organize stored data for use in reasoning and decision-making by the system. The agentic AI system may implement activities and results as physical actions (e.g., of the exemplary disclosed adult toys) and/or software commands (e.g., of the exemplary disclosed component described herein). The agentic AI system may utilize output channels such as the exemplary disclosed applications and/or control of the exemplary disclosed adult toys. The agentic AI system may also utilize feedback loops using the exemplary disclosed components to monitor and evaluate results of its actions and feedback (e.g., based on comments and actions of users using the exemplary disclosed devices including for example tipping and other user behavior). The agentic AI system may utilize any suitable machine learning operations such as supervised learning (e.g., involving labeling data and focusing on performance of specific tasks), reinforcement learning (e.g., involving rewards and penalties received on a trial and error basis), transfer learning (e.g., use of knowledge obtained on previous tasks for use on future tasks), and/or unsupervised learning (e.g., system 300 detecting relationships and patterns without the use of data labeling).

Figure 18:
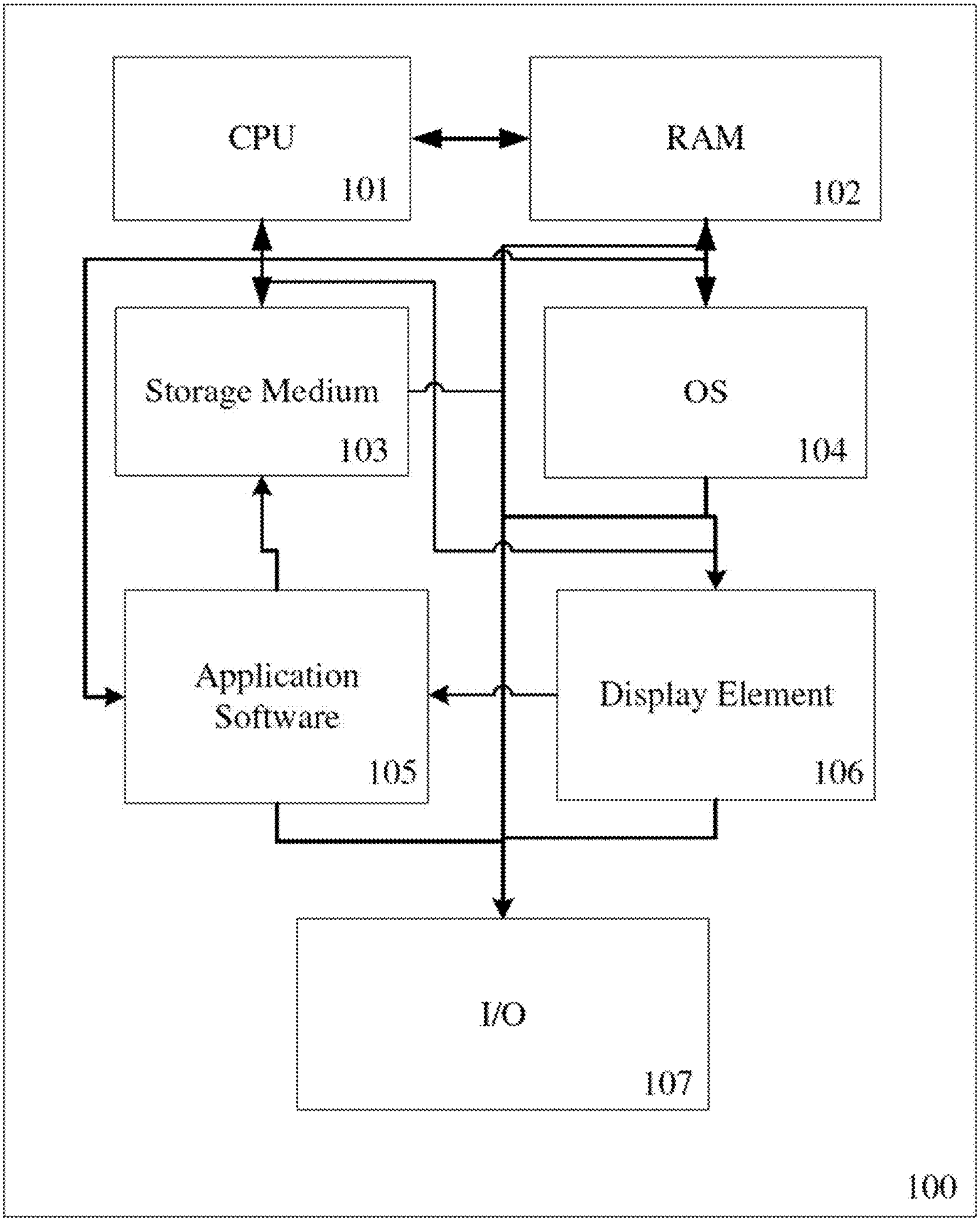
FIG. 18 is a schematic illustration of an exemplary computing device, in accordance with at least some exemplary embodiments of the present disclosure.

An illustrative representation of a computing device appropriate for use with embodiments of the system of the present disclosure is shown in FIG. 18. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 19, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 19:
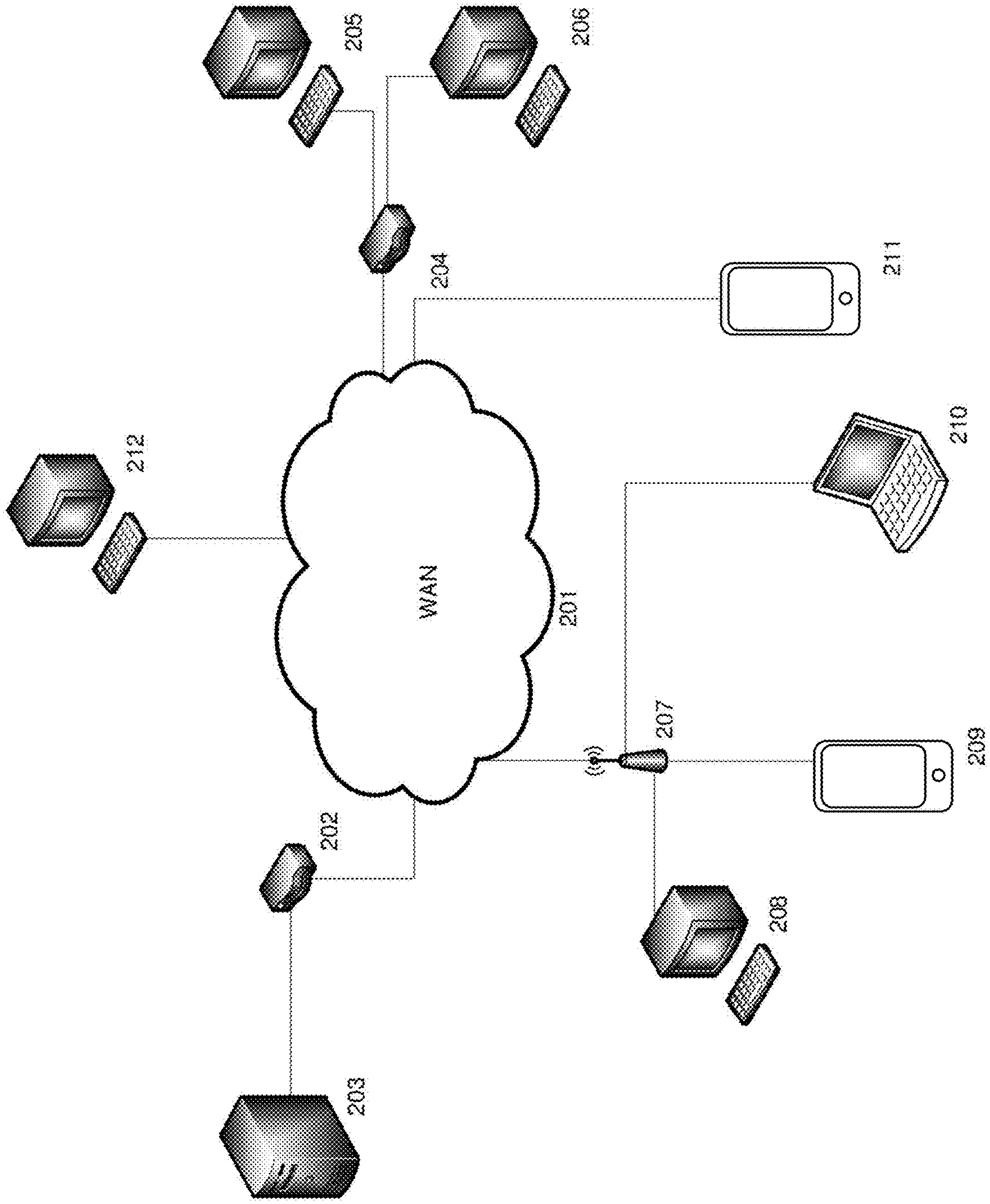
FIG. 19 is a schematic illustration of an exemplary network, in accordance with at least some exemplary embodiments of the present disclosure.

Referring to FIG. 19, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 19, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communication means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine that may be a networked configuration provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed system, apparatus, and method. It is intended that the specification and examples be considered as exemplary only, with a true scope being indicated by the following claims.

What is claimed is:

1. A sexual stimulation device, comprising:

a housing, at least one end portion of which includes an opening;

a flexible massage portion, which is at least partially disposed in the housing, and includes a massage channel that is configured to accommodate a phallic member and an insertion opening configured to allow the phallic member to enter and exit the massage channel; and a sensor component, which is disposed within the housing, and is configured to monitor changes in parameters related to a volume of the flexible massage portion caused by a movement of the phallic member in the massage channel, thereby providing data support for monitoring the movement of the phallic member.

2. The sexual stimulation device according to claim 1, wherein the changes in parameters related to the volume of the flexible massage portion are changes in a volumetric space formed between the flexible massage portion and the housing based on morphological transformation of the flexible massage portion itself.

3. The sexual stimulation device according to claim 1, wherein the changes in parameters related to the volume of the flexible massage portion are changes in the volume of the flexible massage portion itself based on morphological transformation of the flexible massage portion.

4. The sexual stimulation device according to claim 1, wherein the changes in parameters related to the volume of the flexible massage portion are changes in the volume of the flexible massage portion relative to a volume of the phallic member.

5. The sexual stimulation device according to claim 1, wherein the sensor component is an optical sensor component.

6. The sexual stimulation device according to claim 5, wherein the sensor component is a rotatable optical sensor component.

7. The sexual stimulation device according to claim 6, wherein:

the sensor component includes at least one of an optical element and a rotating structure configured to rotatably drive the optical element; and the optical element is a laser sensor or an infrared sensor.

8. The sexual stimulation device according to claim 5, wherein the optical sensor component includes a laser emitter and a laser receiver.

9. The sexual stimulation device according to claim 5, wherein a scanning range of the optical sensor component is less than a preset threshold, so that the scanning range of the optical sensor component only covers the flexible massage portion.

10. The sexual stimulation device according to claim 5, wherein:

a light blocking plate is disposed at a peripheral side of the optical sensor component;

the light blocking plate is configured to limit a range of beam emission angles of the optical sensor component; and a light absorbing layer is provided on the light blocking plate.

11. The sexual stimulation device according to claim 1, wherein the sensor component is disposed between the housing and the flexible massage portion.

12. The sexual stimulation device according to claim 11, wherein an optical element of the sensor component is disposed at a corner space bounded by the flexible massage portion, a bottom wall of the housing, and a side wall of the housing, wherein the bottom wall is located at a side of the housing disposed away from the opening of the housing.

13. The sexual stimulation device according to claim 1, further comprising a control module equipped with a controller, wherein:

the controller is communicatively connected to the sensor component; and the controller is configured to calculate at least one of an insertion depth, an insertion frequency, or an insertion time of the phallic member in the flexible massage portion based on monitoring information of the sensor component.

14. The sexual stimulation device according to claim 1, further comprising a vibration component disposed adjacent to or attached to the flexible massage portion.

15. A monitoring method, comprising:

monitoring a sexual stimulation device that includes:

a massage portion configured to apply sexual stimulation to at least a genital portion of a user; and a sensor component, which is configured to monitor changes in parameters related to the massage portion caused by a relative movement of the massage portion and the genital portion, thereby providing data support for monitoring the relative movement of the massage portion and the genital portion;

wherein monitoring the changes in parameters related to the massage portion includes:

performing static data acquisition by obtaining static three-dimensional data related to the massage portion in a non-working state using the sensor component;

performing target data acquisition by obtaining real-time three-dimensional data related to the massage portion in a working state using the sensor component, and comparing the real-time three-dimensional data with the static three-dimensional data to determine a target three-dimensional data that has undergone changes; and performing analysis based on the target three-dimensional data, including analyzing and obtaining a motion trajectory of the massage portion.

16. The monitoring method according to claim 15, wherein the static three-dimensional data and the real-time three-dimensional data are multi-frame point clouds.

17. The monitoring method according to claim 15, wherein performing the target data acquisition includes:

obtaining the real-time three-dimensional data related to the massage portion in the working state using the sensor component when the genital portion and the massage portion are moving relative to each other;

comparing each frame point cloud of the real-time three-dimensional data with the static three-dimensional data; and eliminating point clouds that overlap with point clouds of the static three-dimensional data, wherein remaining point clouds are retained as the target three-dimensional data.

18. The monitoring method according to claim 17, wherein performing the analysis includes:

performing a clustering algorithm on remaining points of the remaining point clouds, and dividing the remaining points into multiple independent target groups; and analyzing a motion trajectory of the multiple independent target groups to obtain the motion trajectory of the massage portion.

19. A sexual stimulation system, comprising:

a sexual stimulation device, including:

a housing, at least one end portion of which includes an opening;

a flexible massage portion, which is at least partially disposed in the housing, and includes a massage channel that is configured to accommodate a phallic member and an insertion opening configured to allow the phallic member to enter and exit the massage channel; and a sensor component, which is disposed within the housing, and is configured to monitor changes in parameters related to a volume of the flexible massage portion caused by a movement of the phallic member in the massage channel, thereby providing data support for monitoring the movement of the phallic member; and a remote device configured to receive data of the data support from the sexual stimulation device.

20. The sexual stimulation system according to claim 19, wherein the sexual stimulation system includes a female sexual stimulation device, which is configured to communicate with the sexual stimulation device via the remote device.

* * * * *